(12) United States Patent
Liu et al.

(10) Patent No.: US 12,536,114 B2
(45) Date of Patent: Jan. 27, 2026

(54) SYSTEM AND METHOD FOR GUARDING BIT DATA PACKET SELF-RECOVERY WITH A DATA PACKET COMMUNICATION AND POLLING SYSTEM FOR WIRELESS INPUT/OUTPUT (IO) DEVICES

(71) Applicant: Dell Products, LP, Round Rock, TX (US)

(72) Inventors: Jui Chang Liu, New Taipei (TW); Kai Leong Wong, Singapore (SG); Karthikeyan Krishnakumar, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 155 days.

(21) Appl. No.: 18/229,470

(22) Filed: Aug. 2, 2023

(65) Prior Publication Data

US 2025/0045221 A1 Feb. 6, 2025

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC .................................. H04L 1/02; H04L 1/188
See application file for complete search history.

(56) References Cited

U.S. PATENT DOCUMENTS

| | | | |
|---|---|---|---|
| 8,996,962 B2 | 3/2015 | Zopf | |
| 9,531,539 B2 | 12/2016 | Shimoyama | |
| 10,848,326 B2 | 11/2020 | Noguchi | |
| 10,904,006 B2 | 1/2021 | Ohori | |
| 10,985,914 B2 | 4/2021 | Noguchi | |
| 11,271,715 B2 | 3/2022 | Bezzateev | |
| 11,411,989 B2 | 8/2022 | Goodes | |
| 11,469,902 B2 | 10/2022 | Kounavis | |
| 2003/0035406 A1* | 2/2003 | Fraser | H04M 1/72502 370/347 |
| 2003/0048851 A1* | 3/2003 | Hwang | H04L 1/203 375/240.26 |
| 2003/0118031 A1* | 6/2003 | Classon | H04L 1/1845 370/395.54 |
| 2004/0032853 A1* | 2/2004 | D'Amico | H04L 1/02 370/349 |
| 2006/0156203 A1* | 7/2006 | Naoi | H04L 1/188 714/776 |

(Continued)

*Primary Examiner* — Getente A Yimer
(74) *Attorney, Agent, or Firm* — Prol Intellectual Property Law, PLLC; H. Kenneth Prol

(57) ABSTRACT

A guarding bit data packet self-recovery system executing at a wireless dongle or adapter of an information handling system comprising a controller to transmit a polling packet including instructions to a wireless input/output (IO) device to return a packet frame of a specified number of data packets at a specified data packet length via a wireless link and the controller to determine conditions of data error levels at a first threshold level and noise level below noise threshold level before generating instructions in a polling packet for the wireless IO device to transmit split bytes including guarding bits coded into each split byte via a Hamming algorithm and the controller to receive the packet frame with the split bytes and guarding bits and decoding the split byte to detect and correct a bit error located in the split byte to recover the wireless IO device data from the split bytes.

20 Claims, 6 Drawing Sheets

(56) References Cited

U.S. PATENT DOCUMENTS

| | | | |
|---|---|---|---|
| 2007/0218863 A1* | 9/2007 | Futatsugi | H04B 17/24 455/403 |
| 2008/0025204 A1* | 1/2008 | Radha | H03M 13/6527 370/216 |
| 2009/0080396 A1* | 3/2009 | Song | H04W 4/08 370/338 |
| 2014/0197863 A1* | 7/2014 | Huott | H03K 19/003 326/9 |
| 2015/0365229 A1 | 12/2015 | Patey | |
| 2020/0028833 A1 | 1/2020 | Goodes | |
| 2020/0403779 A1 | 12/2020 | Gopal | |
| 2021/0089388 A1 | 3/2021 | Makaram | |
| 2021/0203502 A1 | 7/2021 | Cheung | |
| 2022/0224532 A1 | 7/2022 | Bezzateev | |

* cited by examiner

SYSTEM AND METHOD FOR GUARDING BIT DATA PACKET SELF-RECOVERY WITH A DATA PACKET COMMUNICATION AND POLLING SYSTEM FOR WIRELESS INPUT/OUTPUT (IO) DEVICES

FIELD OF THE DISCLOSURE

The present disclosure generally relates to wireless input/output (IO) devices, such as mice, keyboards, earbuds, headphones, headsets, and virtual reality peripherals. More specifically, the present disclosure relates to a wireless communication from a wireless IO device to an information handling system while for orchestrating transmission by one or more wireless IO devices of data packets to the information handling system with data packet error detection and mitigation including a data packet self-recovery mode.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more peripheral input/output devices such as a keyboard, mouse, touchpad, display device, wearable peripheral device, speakers, earbud, headphone, microphone, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
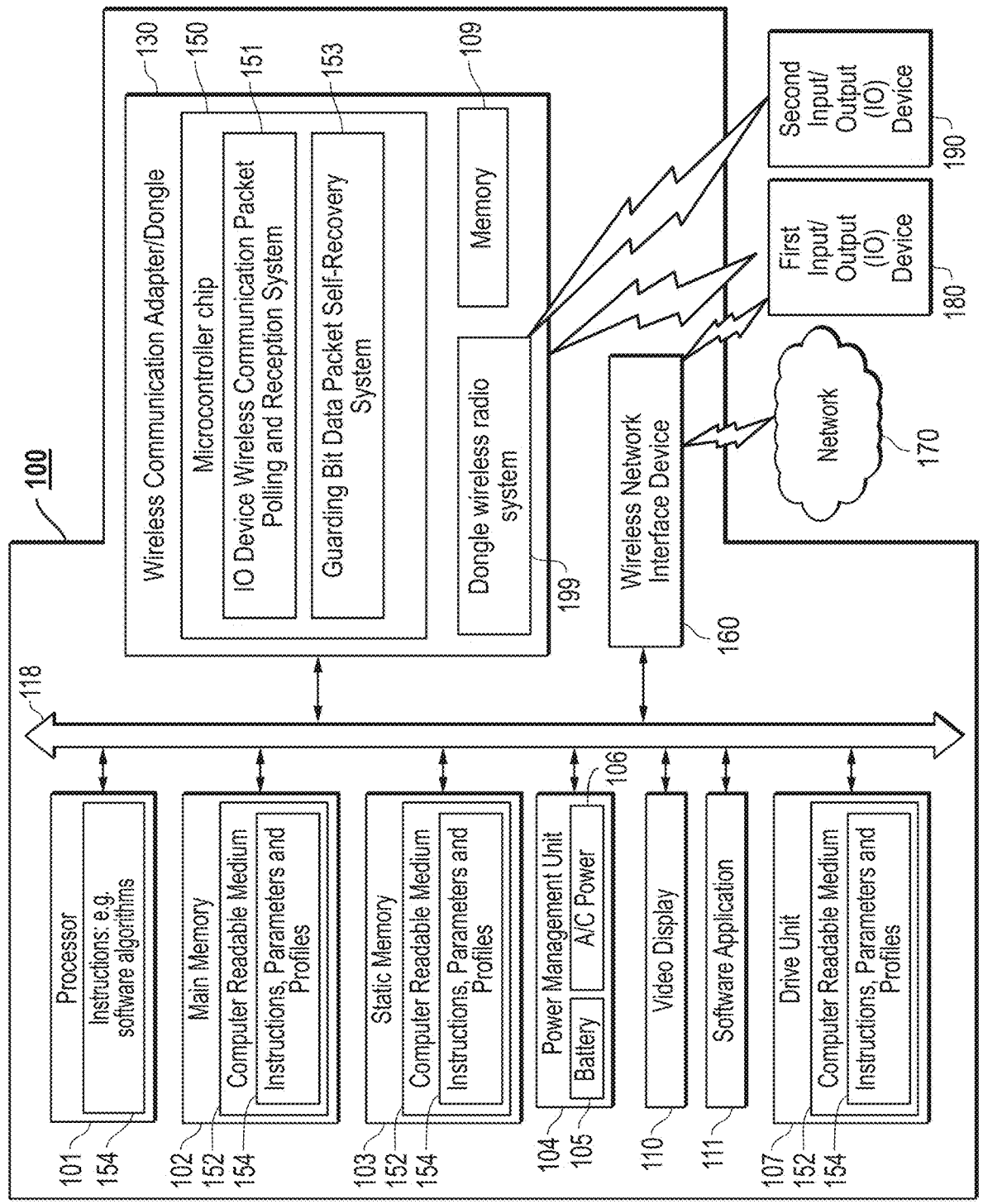
FIG. 1 is a block diagram illustrating an information handling system with a wireless radio system or operatively coupled to a wireless communication adapter/dongle orchestrating wireless communication with a wireless input/output (IO) device with a guarding bit data packet self-recovery system for error mitigation according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of information handling systems such as smart phones, tablets, or laptops may employ one or a plurality of wireless input/output (IO) devices (e.g., mouse, keyboard, earbuds, headphones, smart speakers, headsets including headphones and speakers, or virtual reality peripherals) located remotely from the information handling system to wirelessly transmit and receive IO data such as keystrokes, mouse positional data, or audiovisual information. Many existing systems employ a wireless communication adapter/dongle operably connected to the information handling system (e.g., desktop, laptop, or tablet computer) to pair with and communicate wirelessly with one or more of these wireless IO devices. In other embodiments, a wireless communication adapter/dongle may be integrated as part of the wireless radio adapter internal to the information handling system for pairing with and communicating wirelessly with one or more of these wireless IO devices. Many manufacturers of these wireless IO devices build these devices to provide the most basic or rudimentary communication capabilities, for example, that comply with the Bluetooth® Low Energy (BLE) communication standard.

For example, many existing wireless IO devices are designed to communicate with a wireless communication adapter/dongle using a one reception/one transmission (1TX/1RX) format that requires a wireless communication adapter/dongle to respond to every data packet received from a wireless IO device by transmitting an acknowledgment (ACK) data packet. In other words, each time the wireless communication adapter/dongle operating in receive mode receives a data packet, it must then switch to transmit mode and transmit an ACK data packet back to the wireless IO device from which the initial data packet was received. The wireless communication adapter/dongle may then switch back to a receive mode to receive the next data packet from the wireless IO device. This process may be repeated each time a new data packet is generated at the wireless IO device, for example. More specifically, in the case of a wireless mouse, this process may be repeated each time the wireless mouse determines the location of the mouse has changed, prompting a correlated change in the position of a cursor within a display device for the information handling system. Thus, this mode-switching may occur multiple times per second in some cases. Further, detected data packet errors, such as lost packets, or data bit errors in data packets, or other errors may be mitigated in current systems by issuing a retransmit request to retransmit the missing or errant packet or, in some aspect, a frequency hopping instruction to select a different channel for wireless IO device wireless communications. These aspects have limitations and drawbacks for wireless airtime congestion as well as wireless performance of wireless IO devices operatively coupled to an information handling system.

For example, each of these transmission/reception mode switches consumes power, requires more airtime for acknowledgments, and an increase potential for collision between incoming wireless IO device data packets and outgoing ACK data packets. Such a 1TX/1RX system may be limited in data throughput and consume power unnecessarily for such transmit and receive switches during operations. Further, in the case of errors in data packets as detected by a parity check or with missing packets, the wireless communication adapter/dongle require a retransmit or may select a different channel in a frequency hopping execution to avoid interference or congestion that may occur on the current wireless communication channel in the wireless IO device communication radiofrequency band. A retransmit request received by the wireless IO device may cause the wireless IO device to resend the missed or errant data packet thus occupying airtime and causing congestion as well as wasting energy for a resent. Further a frequency hopping instruction requires energy and airtime congestion to scan channels to detect a clear channel, initiate a wireless link on the new channel via a handshake and then establish a new channel. Such systems may cause the customer to experience slow response from a wireless IO device, a lag between their input via the wireless IO device (e.g., movement of the mouse) and the corresponding feedback displayed by the information handling system (e.g., movement of the cursor), or may cause the cursor to jump suddenly from one position to another and may consume unnecessary power. As a result, existing systems employing this 1TX/1RX approach may fail to meet customer needs during execution of latency-sensitive software applications such as gaming applications or other high definition audio/visual applications or may be otherwise inefficient. This wireless communication protocol may be used however with the error correction using split bytes with guarding bits according to embodiments of the present disclosure. Indeed, the data packet error mitigation for wireless IO device data packets including using a guarding bit data packet self-recovery system may be used with any wireless IO device communication protocol according to embodiments herein.

For present disclosure, the data packet error mitigation for wireless IO device data packets including using a guarding bit data packet self-recovery system of the present embodiments is discussed in the context of a IO device wireless communication packet polling and reception system in embodiments of the present disclosure orchestrates scheduled delivery of a plurality of data packets from each of one or more wireless IO devices in a data packet communication frame between delivery of ACK data packets as described herein.

The IO device wireless communication packet polling and reception system in embodiments of the present disclosure orchestrates scheduled delivery of a plurality of data packets from each of one or more wireless IO devices in a data packet communication frame between delivery of ACK data packets with a polling to each of those one or more wireless IO devices. This IO device wireless communication packet polling and reception system operates a wireless IO device data communication protocol that may operate with, for example, a Bluetooth® radio layer protocol and data modulation, but has an improved packet data communication protocol according to embodiments herein. In embodiments of the present disclosure, a wireless radio adapter, such as in a wireless communication adapter/dongle, may receive a request to connect from one or more wireless IO devices (e.g., mouse and headset), and may respond by transmitting a polling packet that instructs each of the wireless IO devices paired with the wireless communication adapter/dongle to transmit a specified number of data packets of a specified length and at specified time slots during a first data packet communication frame between the wireless communication adapter/dongle and each of the paired wireless IO devices.

The IO device wireless communication packet polling and reception system selects the number of data packets and length of data packets for responsive data packet communication frames based on any of several factors according to embodiments of the present disclosure. Factors for selected data packet number or selected data packet length depend on the identified wireless IO device, on a software application detected as executing on the information handling system, on user selection, and on entering a guarding bit data packet self-recovery mode according to embodiments herein. The select number of packets, select packet length, and timeslots assigned in a data packet communication frame in response to the polling packet from a wireless communication adapter or dongle may be adjusted on-the-fly between polling packets or within polling packets to change such selections between consecutive data packet communication frames. A microcontroller executing code instructions of the IO device wireless communication packet polling and reception system at the wireless communication adapter/dongle may ensure that, during this first data packet communication frame in which time slots have been allocated to the one or more wireless IO devices (e.g., mouse and headset), the wireless radio system, such as in the wireless communication adapter/dongle, remains in a receive mode to receive data packets from the one or more paired wireless IO devices in accordance with the number of packets prescribed and the duration (e.g., based on packet lengths), selected, prescribed as suitable for an executing software application, set as default, or adjusted for error mitigation from each of the one or more wireless IO devices. In other words, the controller of the wireless communication adapter/dongle or other wireless radio adapter may avoid any power loss from additional airtime or inadvertent collision threat due to rapid switching between RX/TX modes during this first data packet communication frame.

Further, with the guarding bit data packet self-recovery system, the wireless communication dongle or adapter may instruct the wireless IO device from which a manageable threshold rate of data packet errors are being detected to split each data byte in a packet payload into two packets on the fly and use the additional bits across the two split bytes for encoding with guarding bits or Hamming bits to enable self-recovery when the data packets are delivered. Additionally, each split byte may add an extra parity bit for each half byte or nibble that was split from the pre-split wireless IO device data byte to operate to confirm detected bit error. In this way, one or two bit errors across 8 data bits, as two 4 bit nibbles, in two split bytes can be detected and corrected within the application of the Hamming algorithm. Since most data packet errors, up to 70% by some estimations, are single bit errors or at least 2 bit or smaller errors, this may substantially reduce the need for packet retransmission requests or even complicated frequency hopping execution. Upon detecting errors and a sufficiently low noise interference level such that error numbers are not too frequent or multiple bit errors are not occurring in each split byte, the microcontroller executing code instructions of the IO device wireless communication packet polling and reception system at the wireless communication adapter/dongle may dynamically turn on guarding bit data packet self-recovery mode of the guarding bit data packet self-recovery system in embodiments herein. The guarding bit data packet self-recovery system may dynamically change the specified number of data packets for a wireless IO device from which errors are being detected to utilize the split byte with guarding bits of the guarding bit data packet self-recovery system according an embodiment of the present disclosure herein.

Following the first data packet communication frame at the end of a time period determined by the number of packets expected, packet lengths, and any spacing time, the controller of the wireless communication adapter/dongle or other wireless radio adapter executing code instructions of the IO device wireless communication packet polling and reception system may switch to transmit mode and transmit to each of the paired wireless IO devices an acknowledgement packet identifying the number of packets received during the first data packet communication frame from each of the paired wireless IO devices. In addition, this acknowledgement packet may further include instructions for the one or more paired wireless IO devices to transmit a selected, specified number of data packets of a specified length according to settings selected by a user, specified as prescribed as suitable for an executing software application, or adjusted according to the guarding bits data packet self-recovery system in various embodiments. The specified number of data bits at a specified data packet length are transmitted as well at specified time slots during a second data packet communication frame between the wireless communication adapter/dongle and each of the paired wireless IO devices. This specified number of packets, packet lengths, and specified time slots may remain the same as in the first data packet communication frame or may be adjusted according to various embodiments herein for the second data packet communication frame. In other embodiments, a stream of any number of data packets pursuant to any wireless IO device communication protocol may be received, and an acknowledgement may be sent in response with instructions to implement the data packet error mitigation for wireless IO device data packets including using a guarding bit data packet self-recovery system upon detection of an error.

This orchestration of data packets transmitted from one or more wireless IO devices to the wireless dongle or wireless radio system executing code instructions of the IO device wireless communication packet polling and reception system presents an opportunity to tailor the specified number of packets and specified packet lengths identified within these polling packets to implement the use of split bytes with encoded guarding bits of the guarding bits data packet self-recovery system. Further, select data packet number or data packet length may be adjusted to a suited to performance of a wireless IO device suitable for providing input for one or more detected software applications executing at the information handling system and minimizing performance and energy costly error mitigation measures. Such performance may be gauged according to one or more wireless IO device prioritized performance metrics for the executing software application and stored within one or more performance policies for the wireless IO device or devices (e.g., mouse) at the wireless communication adapter/dongle, at the wireless communications radio system, or elsewhere in the information handling system. For example, some software applications may be associated with a developer-specified or user-specified prioritized performance metric for low latency between transmission of the first data packet within consecutive data packet communication frames (e.g., inter-frame latency), for minimum number of data packets received from the wireless IO device at the wireless communication adapter/dongle per second, or a required speed at which a wireless mouse transmits each positional measurement of the mouse to the wireless dongle or wireless radio system, which may be referred to herein as a "wireless communication adapter/dongle report rate," or a "wireless communication radio system report rate," as is suitable for particular executing software applications Upon pairing of a wireless IO device with the wireless communication adapter/dongle or wireless radio system in embodiments of the present disclosure, a controller for the wireless communication adapter/dongle or wireless radio system may execute code instructions of the IO device wireless communication packet polling and reception system to identify, the wireless IO device, user settings or one or more software applications currently executing at the information handling system to identify the performance policy for the paired wireless IO device. A controller for the wireless communication adapter/dongle or wireless communication radio system in embodiments may access an estimated wireless IO device data packet communication performance table stored in firmware for the controller to identify and select a wireless IO device application suited data packet number and a wireless IO device application suited data packet length that is estimated to meet the user setting, software application specific wireless IO device prioritized performance requirements, or to enable the guarding bits data packet self-recovery system for data packet error mitigation. The controller of the wireless communication adapter/dongle or wireless communications radio system may then generate and transmit to the wireless IO device a polling packet instructing transmission of a number of selected data packets corresponding to the wireless IO device having the selected data packet length during an upcoming data packet communication frame. In such a way, the IO device wireless communication packet polling and reception system may tailor the selected, specified number of packets and selected, specified packet lengths identified within these polling packets suited for high performance of wireless IO device operating with the information handling system.

FIG. 1 illustrates an information handling system 100 according to several aspects of the present disclosure. As described herein, an information handling system 100 or a controller 150 of a wireless communication adapter/dongle or integrated wireless radio adapter 130 operably connected to the information handling system 100 may execute code instructions of an IO device wireless communication packet polling and reception system 151 in an embodiment to orchestrate scheduled delivery of a plurality of data packets from each of one or more paired wireless input/output (IO) devices (e.g., 180 and 190) during scheduled data packet communication frames with adjustability as to selected number of data packets or as to selected packet lengths from each of the one or more paired wireless input/output (IO) devices (e.g., 180 and 190).

When data packet errors, as with lost packets, packets with bit errors as shown in cyclical redundancy check (CRC) or parity bits, or other data packet errors occur, the IO device wireless communication packet polling and reception system 151 orchestrating data packet communication frames for a wireless IO device communication protocol of embodiments herein will implement data packet error mitigation measures. These may include data packet errors from poor radio conditions, such as poor received signal strength indicator (RSSI) values, signal to noise ratios, or other radio quality metrics being poor for the data packet communication channel. Other factors, such as congestion, packet collision, or other error causes may also cause data packet errors. Depending on detected signal quality levels, such as RSSI levels for a data packet communication channel and depending on the level of data packet errors detected, one or several data packet error mitigation measures may be instructed by the IO device wireless communication packet polling and reception system 151 executing on the hardware processing device, such as a hardware microcontroller 150, of the wireless communication dongle or adapter 130 according to embodiments herein. The hardware processing device, such as microcontroller 150 of the wireless communication dongle or adapter may execute code instructions of a guarding bit data packet self-recovery system 153 as part of the IO device wireless communication packet polling and reception system 151 or as part of another wireless IO device communication protocol in selecting and implementing among a plurality of data packet error mitigation measures. For example, depending on RSSI levels and data packet error rate levels meeting or falling below one or more thresholds, the guarding bit data packet self-recovery system 153 as part of the IO device wireless communication packet polling and reception system 151 or as part of another wireless IO device communication protocol may select among plural data packet error mitigation measures according to embodiments herein. These data packet error mitigation measures may include selecting from among executing instructions to implement split data bytes and encoding added guarding bits in the split data bytes to recover errant bits of data in wireless IO device data packets, executing instructions to implement packet retransmission requests for errant data packets, executing instructions to implement frequency hopping for different radio frequency channels in a wireless communication band, or some combination according to various embodiments.

It is appreciated that information handling system 100 may use a wireless communication adapter/dongle or integrated wireless radio adapter 130 to wirelessly communicate with one or more wireless IO devices 180 or 190. In embodiments herein, wireless communications adapter/dongle 130 may refer to a dongle operatively coupled to the information handling system 100 such as via a port or may be integrated within the information handling system 100 such as with an integrated wireless radio adapter with antenna system for wireless communication with the wireless IO devices 180 or 190. In various embodiments a wireless communications adapter/dongle 130, whether integrated or not within the information handling system 100 may operate using the Bluetooth® Low Energy (BLE) radio layer protocol as modified by wireless IO device communication protocols of the embodiments herein. An information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 152 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware controller, or any combination thereof. Additional components of the information handling system 100 may include one or more storage devices 103 or 107, a wireless network interface device 160, and an internal or external wireless communication adapter/dongle 130 (for example, an external wireless communication adapter/dongle). A power management unit (PMU) 104 supplying power to the information handling system 100, via a battery 105 or an alternating current (A/C) power adapter 106 may supply power to one or more components of the information handling system 100, including the hardware processor 101, the wireless network interface device 160, a static memory 103 or drive unit 107, the wireless communication adapter/dongle 130, a video display 110, or other components of an information handling system. The video display 110 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 in an embodiment is operably coupled to a wireless communications adapter/dongle 130, which may orchestrate scheduled delivery of a plurality of data packets from each one or more wireless input/output (IO) devices (e.g., 180 and 190) during scheduled data packet communication frames according to various embodiments of the present disclosure. The wireless communication adapter/dongle 130 or integrated wireless radio adapter in an embodiment may house a microcontroller 150 executing firmware instructions of the IO device wireless communication packet polling and reception system 151 in an embodiment or of another wireless IO device communication protocol in other embodiments. Also, as described in embodiments herein, the microcontroller may execute code instructions of the guarding bit data packet self-recovery system 153 as part of the IO device wireless communication packet polling and reception system 151 or another wireless IO device communication protocol may select among plural data packet error mitigation measures and implement split data bytes with encoded guarding bits when conditions are detected.

The wireless communication adapter/dongle 130 may be a dongle in one embodiment that is operatively coupled to the information handling system 100 through insertion of the wireless communication adapter/dongle within a USB port of the information handling system 100, for example. In another embodiment, the wireless communication adapter/dongle 130 may be incorporated within the housing of the information handling system 100 as part of an integrated wireless radio adapter and operatively coupled to the bus 108 of the information handling system 100 through one of several means for transmitting data, including connection through a USB hub, a Thunderbolt hub, or any other type of data transfer hub known in the art. In some embodiments, the wireless communication adapter/dongle 130 may be referred to as just a wireless communication adapter/dongle.

The wireless communication adapter/dongle 130 in an embodiment may be wirelessly coupled to one or more wireless input output (IO) devices 180 and 190 capable of wirelessly receiving and transmitting data via the Bluetooth® wireless radio protocol with the wireless communication adapter/dongle 130 as modified by wireless IO device communication protocols of the embodiments herein. In some embodiments, the wireless IO devices 180 or 190 may comprise a mouse, keyboard, speaker, headphones, earbuds, headset including a microphone, or various virtual reality peripherals including a headset or handheld input devices. Information handling system 100 may be any information handling system, such as a smart phone, tablet, or laptop, used with a wireless IO device 180 or 190.

The wireless communication adapter/dongle wireless radio system 199 or other integrated wireless radio adapter in an embodiment may be capable of communication between the information handling system 100 and the paired wireless IO devices 180 and 190 using a wireless link established using Bluetooth® technology such as Bluetooth® or Bluetooth Low Energy (BLE) radio protocols as modified by wireless IO device communication protocols of the embodiments herein, for example. The wireless communication adapter/dongle wireless radio system 199 or other integrated wireless radio adapter in an embodiment may transmit and receive information necessary to pair the wireless IO devices 180 and 190 with the information handling system 100, such as, for example, pairing or wireless communication profiles for pairing the information handling system 100 and the wireless IO devices 180 and 190. Such pairing or wireless communication profiles may operate to identify the wireless IO devices 180 and 190 as a device authorized to transceive data with the information handling system 100 under the paired wireless protocol, as well as information sufficient to identify the wireless IO devices 180 and 190, such as a Media Access Control (MAC) address, IP address, or model number.

The wireless communication adapter/dongle wireless radio system 199 may provide connectivity of the wireless communication adapter/dongle 130 operatively coupled to the information handling system 100 via wireless links to one or more operatively coupled wireless input/output devices 180 or 190, such as mouse, keyboard, earbuds, headphones, smart speakers, or virtual reality peripherals, as described in greater detail herein. Such wireless links may be established pursuant to Bluetooth® or Bluetooth Low Energy® (BLE) radio protocols as modified by wireless IO device communication protocols of the embodiments herein, for example. In some embodiments, the Bluetooth® radio protocols or BLE radio protocols (e.g., protocols established under the Institute of Electrical and Electronics Engineers protocol 802.15.1) may be used to establish a Private Area Network (PAN) (e.g., 170) in which the information handling system 100 may communicate wirelessly with any wireless IO devices (e.g., 180 and 190) paired to the PAN 170 using a Bluetooth® compliant pairing and wireless communication profile according to the wireless IO device communication protocols of the embodiments of the IO device wireless communication packet polling and reception system 150 herein. The PAN 170 in such an embodiment may communicate data between the information handling system 100 and any paired wireless IO devices (e.g., 180 and 190) over short distances using Ultra High Frequency (UHF) radio waves in the Industrial, Scientific, and Medical purposes bands (ISM bands) between 2.402 and 2.48 GHz. Reference to Bluetooth® may refer to either or both of the Bluetooth® or Bluetooth Low Energy (BLE) radio protocols and any revision of those protocols and which are modified under wireless IO device communication protocols of the embodiments herein.

In some aspects of the present disclosure, the wireless communication adapter/dongle wireless radio system 199 may operate two or more wireless links. In other aspects of the present disclosure, the wireless communication adapter/dongle 130 may include a plurality of wireless communication adapter/dongle wireless radio systems, each capable of establishing a separate wireless link to one of the plurality of wireless IO devices (e.g., 180 or 190), such that the wireless communication adapter/dongle 130 may be in communication with a plurality of wireless IO devices (e.g., 180 and 190) via a plurality of wireless links.

The wireless communication adapter/dongle wireless radio system 199 may also operate in accordance with any Bluetooth® radio protocol as modified according to embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.300 to 2.4835 GHz Industrial, Scientific, and Medical (ISM) band.

The present disclosure contemplates a computer-readable medium that includes instructions, parameters, and profiles 154 or receives and executes instructions, parameters, and profiles 154 responsive to a propagated signal, so that a device connected to the wireless communication adapter/dongle wireless radio system 199 may communicate voice, video or data to the wireless communication adapter/dongle 130. The wireless communication adapter/dongle 130 may include a set of instructions 154 that may be executed via a microcontroller 150, for example, to cause the wireless communication adapter/dongle 130 to perform any one or more of the methods or computer-based functions disclosed herein. For example, instructions 154 may include a particular example of a IO device wireless communication packet polling and reception system 151, or other wireless IO device communication protocols. Application instructions 154 may also include any application processing drivers, or the like executing on information handling system 100 or wireless communication adapter/dongle 130.

The IO device wireless communication packet polling and reception system 151 and the guarding bit data packet self-recovery system 153 may utilize a computer-readable medium 152 in which one or more sets of instructions 154 may operate in part as firmware instructions, software instructions, or a combination executed by microcontroller 150 on the wireless communication adapter/dongle 130. The instructions 154 may embody one or more of the methods as described herein. For example, instructions relating to the IO device wireless communication packet polling and reception system 151 or the guarding bit packet self-recovery system 153 may be executed and implement in firmware or software algorithms, and other software or firmware for processes and/or methods of embodiments herein may be stored in computer-readable medium 152. More specifically, instructions 154 may be executed by microcontroller integrated circuit 150 or other processing resources such as an embedded controller (EC) or the processor 101 to orchestrate transmission of data packets from one or more wireless IO devices 180 and 190 with the wireless communication adapter/dongle 130 during orchestration with data packet communication frames according to embodiments of the IO device wireless communication packet polling and reception system 151 or the guarding bit packet self-recovery system 153 herein. In other embodiments, the instructions 154 may be executed via a controller within the integrated wireless network interface device or wireless radio adapter 160 of the information handling system 100.

Memory 109 located and controlled by the wireless communication adapter/dongle 130 may contain computer-readable medium (not shown), such as RAM in an example embodiment. An example of memory 109 includes random access memory (RAM) such as static RAM (SRAM), dynamic RAM (DRAM), non-volatile RAM (NV-RAM), or the like, read only memory (ROM), another type of memory, or a combination thereof as computer-readable medium 152. The instructions, parameters, and profiles 154 of the IO device wireless communication packet polling and reception system 151 may be stored in memory 109 on a computer-readable medium 152 such as a flash memory or magnetic disk in an example embodiment, or may be stored in main memory 102, static memory 103, or within drive unit 107. After an initial pairing process between the wireless communication adapter/dongle 130 and a plurality of wireless IO devices (e.g., 180 and 190), the microcontroller 150 may execute code instructions 154 of the IO device wireless communication packet polling and reception system 151 to orchestrate transmission of a plurality of data packets from one or more of the wireless IO devices (e.g., 180 or 190) during one or more data packet communication frames, as described in embodiments herein. It is contemplated that other wireless IO device protocols may also be used instead in some embodiments of the present disclosure with the data packet error mitigation for wireless IO device data packets including using a guarding bit data packet self-recovery system 153 according to embodiments herein. For present disclosure, the data packet error mitigation for wireless IO device data packets including using a guarding bit data packet self-recovery system of the present embodiments is discussed in the context of a IO device wireless communication packet polling and reception system in embodiments of the present disclosure orchestrates scheduled delivery of a plurality of data packets from each of one or more wireless IO devices in a data packet communication frame between delivery of ACK data packets as described herein. Further, the microcontroller 150 may execute code instructions 154 of the guarding bit packet self-recovery system 153 of the IO device wireless communication packet polling and reception system 151 to select among and execute one or more data packet error mitigation measures to facilitate efficient transmission and reception of data packets under the wireless IO device communication protocol of embodiments herein. Memory 109 in an embodiment may also store one or more performance policies with wireless IO device prioritized performance metrics for paired wireless IO devices, and an estimated wireless IO device data packet communication performance table for tailoring and selecting a specified number of packets and specified packet lengths transmitted by a wireless IO device (e.g., 180 or 190) specific to particular wireless IO devices 180 and 190, suited for high performance of one or more software applications 111 (e.g., gaming software application) executing at the information handling system 100, for selected as part of packet splitting and utilization of guarding bits for data packet error mitigation measure as described in greater detail herein.

The information handling system 100 may include a memory 102, (with computer readable medium 152 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1 or any combination thereof. Any of the hardware processing resources may operate to execute code that is either firmware or software code. Additional components of the information handling system 100 may include one or more storage devices such as static memory 103 or drive unit 107, a wireless network interface device 160, a wireless communication adapter/dongle 130, one or more communications ports for communicating with external devices, as well as various input and output (IO) devices such as video display 110 or wireless IO devices 180 and 190 such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101, the wireless network interface device 160, various components of the wireless communication adapter/dongle 130 (e.g., microcontroller chip 150, memory 109, or wireless communication adapter/dongle wireless radio system 199), a static memory 103 or drive unit 107 or other components of an information handling system.

The wireless network interface device 160 in an embodiment may be capable of communication between the information handling system 100 and network 170 (e.g., LAN, WLAN, WAN, WLAN) in some embodiments. The wireless network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

In some embodiments, software, firmware, dedicated hardware implementations such as application specific integrated circuits, programmable arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software or firmware executing on hardware, including firmware embedded at a device. Hardware processing resources may include processors or controllers, such as an Intel® brand processor, ARM® brand processors, Qualcomm® brand processors, or other processors and chipsets, or other such devices for executing software firmware on hardware capable of operating a relevant environment of the information handling system. In an embodiment, an information handling system 100 may include an integrated circuit or a board-level product having portions thereof that may also be any combination of hardware and software. Devices, hardware resources, or controllers executing software or firmware modules or programs that are in communication with one another need not be in continuous communication with each other, unless expressly specified otherwise. In addition, devices, hardware resources, or controllers executing firmware or software modules or programs that are in communication with one another may communicate directly or indirectly through one or more intermediaries.

Figure 2:
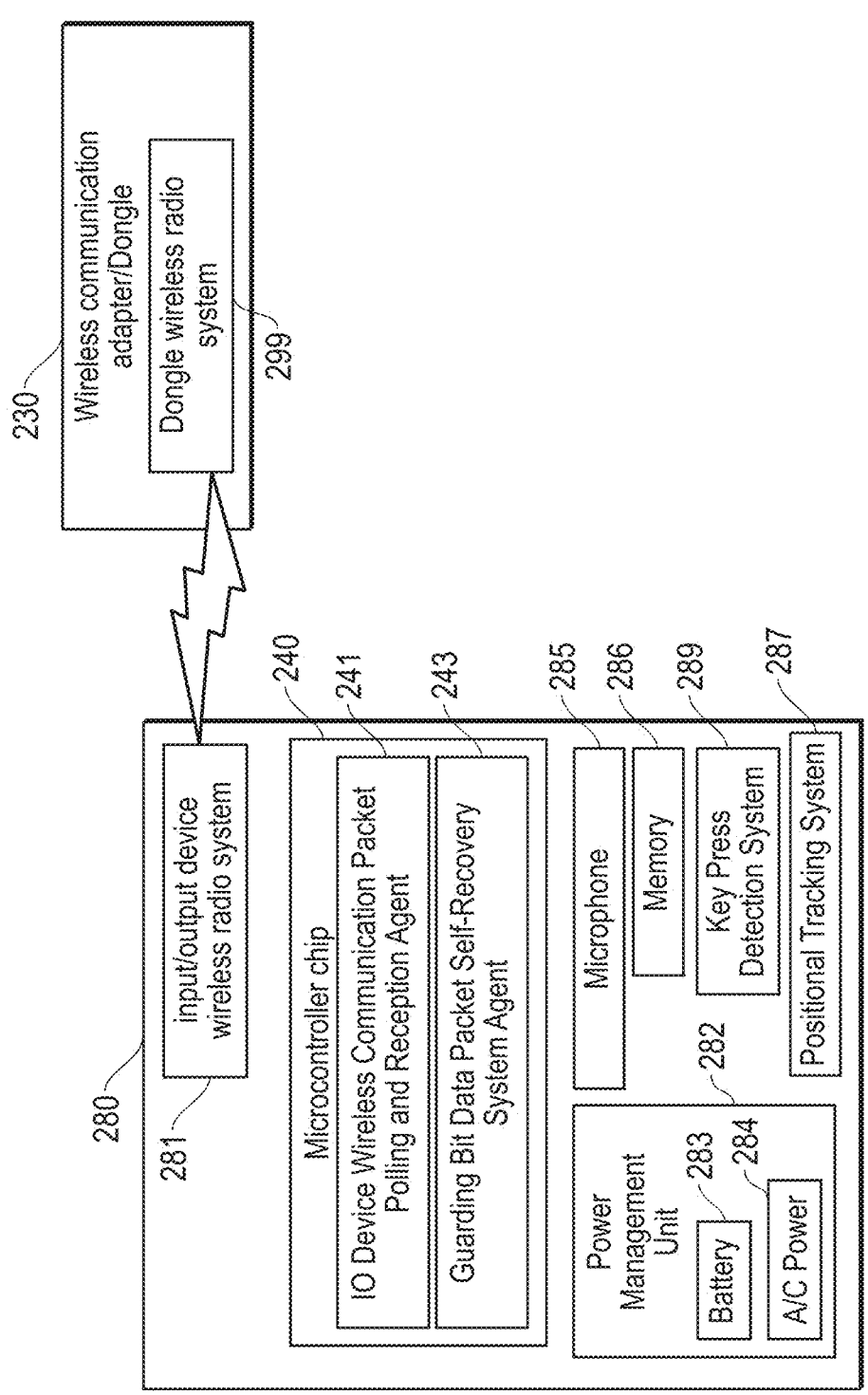
FIG. 2 is a block diagram illustrating a wireless IO device wirelessly paired to a wireless radio adapter or a wireless communication adapter/dongle that is operatively coupled to an information handling system according to an embodiment of the present disclosure.

FIG. 2 is a graphical diagram illustrating a wireless communication adapter/dongle 230 wirelessly paired to a wireless input/output (IO) device 280 according to an embodiment of the present disclosure. As described previously, the wireless communication adapter/dongle 230 may be a dongle device paired to an information handling system or a wireless Bluetooth® radio integrated within an information handling system in various embodiments herein. The wireless IO device 280 in various embodiments herein may comprise a mouse, a keyboard, an audio headset, earbuds, gaming controllers, or various peripheral virtual reality devices (e.g., headset or handheld controllers). A power management unit 282 with a battery 283 or A/C power charging adapter 284 may be on the wireless IO device 280 to provide power to the microcontroller chip 240, the speaker 288, the microphone 285, or other components of the wireless IO device 280. In an embodiment, the wireless IO device 280 may include a microcontroller chip 250 that may be any device or devices that execute instructions, parameters, and profiles 243 of an IO device wireless communication packet polling and reception agent 241 and guiding bit data packet self-recovery system agent 243 at the wireless IO device 280 to transmit data packets from the wireless IO device 280 to the wireless communication adapter/dongle 230 during a data packet communication frame according to orchestrating instructions received from the wireless communication adapter/dongle 230. The data packet error mitigation for wireless IO device data packets including using a guarding bit data packet self-recovery system agent 243 may be used with any wireless IO device communication protocol according to embodiments herein. For present disclosure, the data packet error mitigation for wireless IO device data packets including using a guarding bit data packet self-recovery agent 243 of the present embodiments is discussed in the context of a IO device wireless communication packet polling and reception system and agent 241 in embodiments of the present disclosure orchestrates scheduled delivery of a plurality of data packets from each of one or more wireless IO devices in a data packet communication frame between delivery of ACK data packets as described herein.

As described herein, the wireless communication adapter/dongle 230 in an embodiment may include a controller executing code instructions of an IO device wireless communication packet polling and reception system to orchestrate transmission of plural data packets from one or more paired wireless IO devices (e.g., 280) during any data packet communication frame. A selected number of packets and selected packet length may be determined for wireless packet communications between polling packets from a wireless dongle with acknowledgement by the IO device wireless communication packet polling and reception system. The selected number of packets and selected packet length to be sent in response to a polling packet may be determined based on the wireless IO device type, from wireless IO device prioritized performance metrics suitable for an executing software application detected on the information handling system operatively coupled to the wireless communication adapter/dongle 230, or based on use of split data packets with guarding bits pursuant to execution of the guiding bit data packet self-recovery system agent 243 in embodiments herein. Such an orchestration may be initiated by transmission from the dongle wireless radio system 299 to the IO device wireless radio system 281 with one or more polling packets to each elicit plural data packets, as described herein. The IO device wireless communication packet polling and reception agent 241 of the wireless IO device 280 may operate to instruct the IO device wireless radio system 281 to transmit a selected number of data packets within a synchronized data packet communication frame between the wireless communication adapter/dongle 230 and the wireless IO device 280 according to the received polling packets having coordinating instructions as to the selected number of packets, the selected packet lengths, and time slots to be used. Further, the microcontroller 240 of wireless IO device 280 may execute code instructions the guiding bit data packet self-recovery system agent 243 along with the IO device wireless communication packet polling and reception agent 241.

The IO wireless radio system 281 in an embodiment may be capable of communication between the wireless IO device 280 and the wireless communication adapter/dongle 230 using a wireless link established under radio protocols such as Bluetooth® or Bluetooth Low Energy radio protocols, for example. The IO device wireless radio system 281 may provide connectivity of the wireless IO device 280 to the wireless communication adapter/dongle 230, external or integrated, and is operatively coupled to the information handling system via one or more wireless links. Such wireless links may be established pursuant to Bluetooth® or Bluetooth Low Energy® (BLE) radio protocols and using data modulation as modified by the wireless IO device communication protocol of embodiments of the present disclosure, for example. The IO device wireless radio system 281 may operate in accordance with any Bluetooth® radio protocol as modified by wireless IO device communication protocols of the embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.300 to 2.4835 GHz Industrial, Scientific, and Medical (ISM) band.

The present disclosure contemplates a computer-readable medium that includes instructions, parameters, and profiles or receives and executes instructions, parameters, and profiles responsive to a propagated signal, so that the IO device wireless radio system 281 may communicate voice, video or data to the wireless communication adapter/dongle 230, integrated or operatively coupled to the information handling system. Computer-readable medium can also include code instructions for the software application performance-specific IO device wireless communication packet polling and reception agent 241 or the guiding bit data packet self-recovery system agent 243. In an embodiment in which the wireless IO device 280 comprises a mouse, the wireless IO device 280 may further include a position tracking system 287 capable of recording or tracking changes in position of the mouse, as provided as input by the user of an information handling system. Such positional tracking system 287 may also determine a correlated position change for a cursor or visual graphical representation (e.g., game character, weapon, or camera view) within a software application executing on the information handling system operably connected to the wireless communication adapter/dongle 230. This positional information for the mouse or correlated changes to cursors or other graphical representations at the information handling system may be transmitted within 8 byte coordinate data to the dongle wireless radio system 299 as described herein. In some embodiments, a single data packet may comprise one of these 8 byte coordinate data. In other embodiments, a single data packet may comprise two of these 8 byte coordinate data or so forth for different packet lengths.

In another embodiment in which the wireless IO device 280 comprises a keyboard, the wireless IO device 280 may further include a key press detection system 289 that identifies specific keys pressed by a user. Such key press data may be transmitted as data packets to the dongle wireless radio system 299 as described herein. In yet another embodiment in which the wireless IO device 280 comprises a headset or earbuds, for example, the wireless IO device 280 may further include a microphone 285 for recording of audio user input. Such audio user input in an embodiment may be transmitted as data packets to the dongle wireless radio system 299 as described herein.

The controller executing code instructions of the IO device wireless communication packet polling and reception system at the wireless communication adapter/dongle 230 in an embodiment may instruct the transmission of either one byte of 8 bits of coordinate data or keystroke data within a single data packet or by splitting any byte into two bytes with an added parity bit for the second split byte as well as encoding and adding guarding bits or Hamming bits to the split bytes to enable self-recovery according to execution of some embodiments of data packet error mitigation with the guiding bit data packet self-recovery system agent 243. The execution of split bytes in a data packet may cause adjustments to the selected packet lengths or selected data packet number in some embodiments to accommodate these split bytes under the execution of the guiding bit data packet self-recovery system agent 243. The adjustability of the selected data packet lengths or selected number of data packets on the fly in data packet communication frames is conducted by the IO device wireless communication packet polling and reception agent 240 and polling packet instructions from the wireless communication adapter/dongle 230 executing the IO device wireless communication packet polling and reception system according to embodiments of the present disclosure. The microcontroller 240 at the wireless IO device 380 may receive these instructions and execute the IO device wireless communication packet polling and reception system agent 241, as well as guiding bit data packet self-recovery system agent 243 for applicable data packet error mitigation measures, to orchestrate a response with the selected number of packets and selected packet lengths of data to be received by the wireless communication adapter/dongle 230 according to embodiments herein.

Instructions 243 of the software application performance-specific IO device wireless communication packet polling and reception agent 241 or the guarding bit data packet self-recovery system agent 243 may be executed by the microcontroller chip 250, for example a controller integrated circuit, to transmit such selected number of data packets at a selected length to the wireless communication adapter/dongle 230 at an information handling system pursuant to polling packets generated at the IO device wireless communication packet polling and reception system operating at the wireless communication adapter/dongle 230 and transmitted to the wireless IO device 280 and any utilization of split bytes and guarding bits where applicable as data packet error mitigation. Such instructions of the IO device wireless communication packet polling and reception agent 241 and the guarding bit data packet self-recovery system agent 243 may utilize instructions for transmission of data packets received from a polling packet via the IO device wireless radio system 281 including a selected data packet number and selected data packet length for transmission at allotted data packet transmission time slots, as identified within polling packets received from the wireless communication adapter/dongle 230. Identifying information for the wireless IO device 280 may be stored in memory 286 in an embodiment. Such identifying information in an embodiment may operate to identify the wireless IO device 280 as a device authorized to transceive data with the dongle 230, as well as information sufficient to identify the wireless IO device 280, such as a Media Access Control (MAC) address, IP address, or model number.

The wireless IO device 280 may, in some embodiments includes a processing resource such as a microcontroller 240. Any of the processing resources described herein may be used and may operate to execute code that is either firmware or software code. Instructions may include a IO device wireless communication packet polling and reception agent 241, the guarding bit data packet self-recovery system agent 243 or other software applications, firmware, or drivers detectable by the microcontroller 240 or other processing resource. The instructions in an embodiment may reside completely, or at least partially, within the memory 286.

The wireless IO device 280 may include a set of instructions that may be executed to cause the processing resource such as a microcontroller at the wireless IO device 280 to perform any one or more of the methods or computer-based functions disclosed herein. For example, instructions may include a particular example of an IO device wireless communication packet polling and reception agent 241, a guarding bit data packet self-recovery system agent 243, or other aspects or components. The IO device wireless communication packet polling and reception agent 241 and the guarding bit data packet self-recovery system agent 243 on the wireless IO device 280 may utilize a computer-readable medium in which one or more sets of instructions such as firmware executed with microcontroller chip 240, for example a controller integrated circuit with embedded firmware in an example embodiment. In other embodiments, the IO device wireless communication packet polling and reception agent 241 or the guarding bit data packet self-recovery system agent 243 may operate in part as software or firmware instructions executed on the wireless IO device 280. These code instructions executed by microcontroller 240 may embody one or more of the methods as described herein.

Memory 286 may contain computer-readable medium (not shown), such as RAM in an example embodiment. An example of memory 286 includes random access memory (RAM) such as static RAM (SRAM), dynamic RAM (DRAM), non-volatile RAM (NV-RAM), or the like, read only memory (ROM), another type of memory, or a combination thereof. Memory 286 may also comprise static memory containing computer-readable medium (not shown), such as NOR or NAND flash memory in some example embodiments. The instructions, parameters, and profiles of the IO device wireless communication packet polling and reception agent 241 and the guarding bit data packet self-recovery system agent 243 may be stored in memory 286 on a computer-readable medium such as a flash memory or magnetic disk in an example embodiment.

Figure 3:
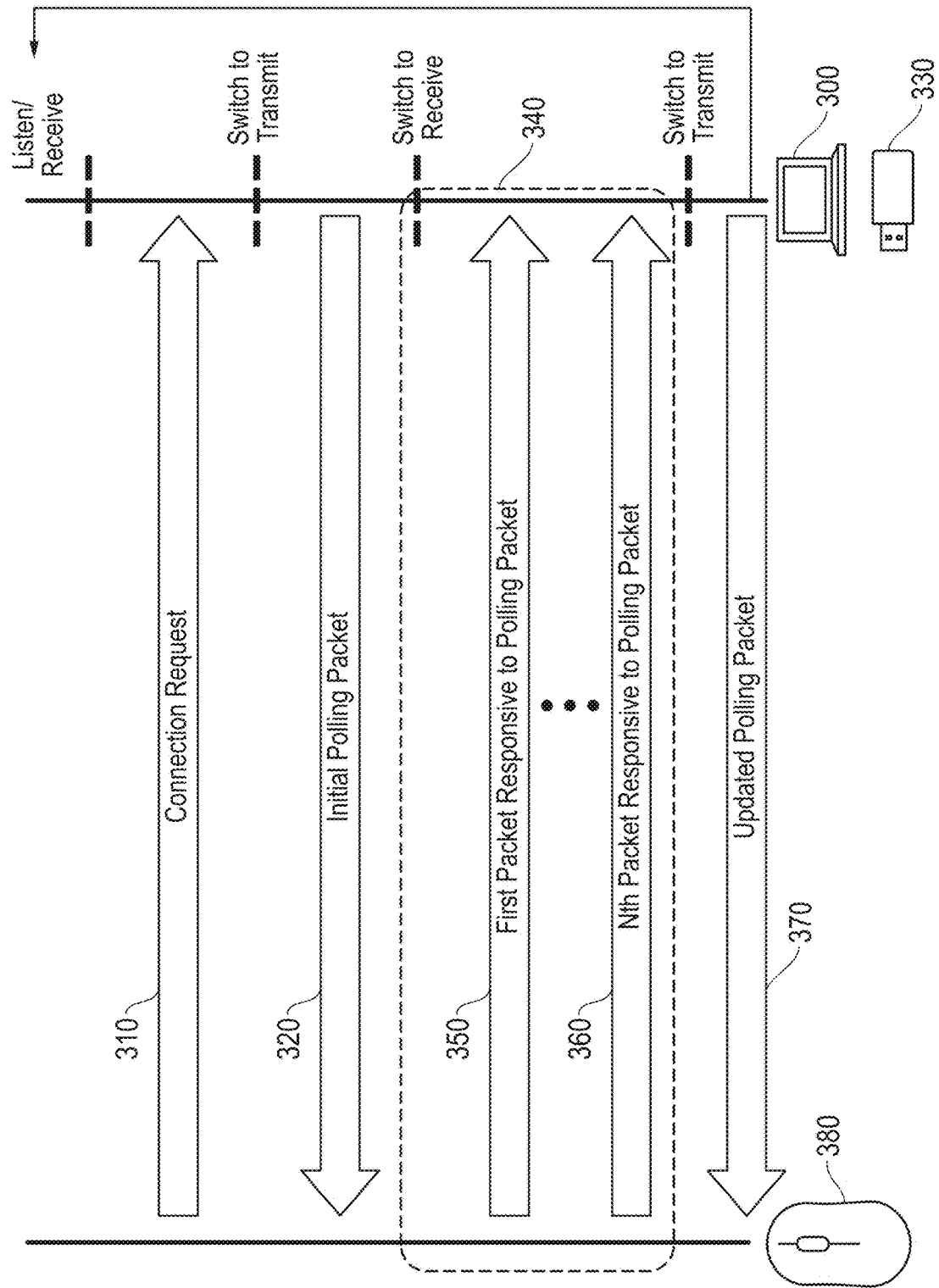
FIG. 3 is a block diagram illustrating a data packet communication frame orchestrated by the IO device wireless communication packet polling and reception system according to an embodiment of the present disclosure.

FIG. 3 is a block diagram illustrating a data packet communication frame between a wireless communication adapter/dongle or integrated wireless radio system and a paired wireless input/output (IO) device orchestrated by a controller of the wireless communication adapter/dongle or integrated wireless radio system executing code instructions of the IO device wireless communication packet polling and reception system according to an embodiment of the present disclosure. This IO device wireless communication packet polling and reception system in embodiments of the present disclosure orchestrates scheduled delivery of a plurality of data packets from each of one or more wireless IO devices in a data packet communication frame is used with the data packet error mitigation for wireless IO device data packets including using a guarding bit data packet self-recovery system may be used with any wireless IO device communication protocol according to embodiments herein. However, it is contemplated that the data packet error mitigation for wireless IO device data packets including using a guarding bit data packet self-recovery system may be used with any wireless IO device communication protocol according to embodiments herein. For present disclosure, the data packet error mitigation for wireless IO device data packets including using a guarding bit data packet self-recovery system of the present embodiments is discussed in the context of a IO device wireless communication packet polling and reception system in embodiments of the present disclosure orchestrates scheduled delivery of a plurality of data packets from each of one or more wireless IO devices in a data packet communication frame between delivery of ACK data packets as described with FIG. 3 herein.

As described herein, the IO device wireless communication packet polling and reception system executing at an information handling system 300 or via a controller within a wireless communication adapter/dongle 330 operably connected to the information handling system 300 in an embodiment may schedule receipt of a plurality of data packets from one or more paired wireless IO devices (e.g., mouse 380) between transmission of polling packets that include an acknowledgement header (ACK) to each of those one or more paired wireless IO devices (e.g., mouse 380). These scheduled deliveries of packets may include a selected number of packets or selected packet lengths that may be adjustable on the fly, such as via subsequent polling packets, in accordance with the wireless IO device prioritized performance metric or metrics, one or more detected executing software applications, and any implemented data packet error mitigation according to embodiments herein. For ease of explanation, the IO device wireless communication packet polling and reception system in various embodiments herein may be described as executing at the wireless communication adapter/dongle 330 in some embodiments herein. However, it is also contemplated that the IO device wireless communication packet polling and reception system may operate internally within an integrated wireless radio system of the information handling system 300 in an embodiment. In other embodiments, the wireless communication adapter/dongle 330 or integrated wireless radio system is capable of establishing wireless links with the wireless IO device 380 according to the Bluetooth® or Bluetooth® Low Energy (BLE) radio layer protocols and as modified by wireless IO device communication protocols of the embodiments herein.

In an embodiment, the wireless communication adapter/dongle 330 (or information handling system 300) may be placed within a receive (RX) mode. Within this RX mode, a wireless radio system of the wireless communication adapter/dongle 330 or the information handling system 300 may scan a plurality of frequencies at which wireless IO devices (e.g., 380) may be expected to transmit requests to connect and communicate with the wireless communication adapter/dongle 330 or the information handling system 300. While in this RX mode, the wireless radio system of the wireless communication adapter/dongle 330 or the information handling system 300 may receive the request to connect 310 with the wireless communication adapter/dongle 330 or the information handling system 300. This connection request 310 in some embodiments may include an identification of the model number or various default communication metrics for the mouse 380 or other identifying information for the mouse 380 or other IO devices that the wireless communication adapter/dongle 330 or the information handling system 300 may use to access stored information identifying such default communications metrics. For example, the connection request 310 may include a standard data packet transmission rate (e.g., 80 Kilobits per second (Kbps)), or standard data packet transmission length (e.g., 23 bytes or 184 bits) for the mouse 380 or other IO devices or any those for any setting set by a user or operating software. As another example, the connection request 310 may include identification for the mouse 380 or other IO devices that is associated with a profile stored at the wireless communication adapter/dongle 330 or the information handling system 300 providing such standard data packet transmission rate or standard data packet transmission length. In still other embodiments, the connection request 310 may include identification for the mouse 380 or other IO devices that is associated with a performance policy for the wireless IO device identifying one or more wireless IO device prioritized performance metrics identified by a user of the information handling system or a developer of a software application as impacting performance of one or more software applications executing at the information handling system. In yet another embodiment, selected data packet number and data packet length may depend on whether the wireless communication dongle 330 determines that a data packet error mitigation measure may be implemented using split data bytes with inserted guarding or Hamming bits. The type of data packet error mitigation measure used and whether split bytes and guarding bits are inserted to accommodate one or two bit errors in data bytes may be determined by execution of code instructions of the guarding bit data packet self-recovery system along with the IO device wireless communication packet polling and reception system of embodiments herein as well as coordination agent code instructions at a wireless IO device.

Upon success of the connection requested, the wireless communication adapter/dongle 330 or the information handling system 300 may switch to a transmit (TX) mode. The controller of the wireless communication adapter/dongle 330 or the information handling system 300 integrated wireless radio system executing code instructions of the IO device wireless communication packet polling and reception system in an embodiment may generate an initial polling packet 320 that instructs each of the wireless IO devices (e.g., 380) paired with the wireless communication adapter/dongle 330 or the information handling system 300 to transmit a plurality of data packets of a selected, specified number and length at specified time slots during a first data packet communication frame between the wireless communication adapter/dongle 330 or the information handling system 300 and each of the paired wireless IO devices (e.g., 380). This selected number and length of packets may be adjustable, for example on the fly during a data packet communication frame in some contexts or on the fly using a later polling packet having different instructions. In one embodiment, the selected number or selected length of data packets instructed may be adjusted on the fly depending on various factors including implementation of data packet error mitigation measures by execution of the guarding bit data packet self-recovery system. A controller for the wireless communication adapter/dongle 330 or the wireless radio system of an information handling system 300 may execute the guarding bit data packet self-recovery system to identify one or more data packet mitigation measures that must be done to improve data packet transmission under detected conditions of RSSI, data packet loss or error frequency, and other factors. Upon execution of the guarding bit data packet self-recovery system detecting certain conditions of RSSI and levels of detected data packet error rates, the system may use split bytes with inserted guarding bits for transmission by the wireless IO device 380 to the wireless communication dongle 330 in an embodiment. With such split bytes instructed, the IO device wireless communication packet polling and reception system must accommodate additional bytes in the data packet communication frame since each wireless IO device data byte is split into two data split byte data bytes. To do so, the IO device wireless communication packet polling and reception system may adjust either the selected number of data packets that are instructed to be transmitted, adjust the selected data packet length, or both. Other factors may also cause the IO device wireless communication packet polling and reception system to dynamically adjust the selected number of data packets or the selected data packet lengths for wireless IO device performance in other embodiments. For example, detecting which software applications are currently executing at the information handling system 300 and a performance policy for the wireless IO device 380 that includes wireless IO device prioritized performance metrics for the one or more software applications receiving data from a coupled wireless IO device 380 may be a factor is adjustment to selected data packet number and selected data packet length.

As described herein, this orchestration of data packets transmitted from one or more wireless IO devices (e.g., mouse 380) to the wireless dongle 330 or wireless radio system of the information handling system 300 executing code instructions of the IO device wireless communication packet polling and reception system presents an opportunity to tailor the selected number of packets and selected packet lengths identified within polling packets (e.g., 320) to accommodate split bytes for periods error rate levels meeting a first data packet error rate threshold. Further, RSSI noise level conditions are below an RSSI noise level threshold such that the guarding bit data packet self-recovery system may determine to use split bytes with guarding bits as a data packet mitigation measure is effective. At too high of an RSSI noise level or other threshold such as very high data packet error rate levels, the data packet error rate is overwhelming with either high bit error levels in packets or lost packets. The split bytes with guarding bits may not be effective in recovering such data bytes. High RSSI noise levels or high data packet error rate levels likely indicate a more ongoing wireless issues requiring different data packet error mitigation measures according to embodiments herein.

In embodiments herein, the hardware controller of a wireless communication dongle may execute code instructions for the guarding bit data packet self-recovery system to identify one or more data packet mitigation measures and this may operate in connection with executing other code instructions of the IO wireless communication packet polling and reception system for determining selected number of data packets and selected data packet lengths in a data packet communication frame from one or more wireless IO devices. For example, the IO wireless communication packet polling and reception system may be executed to also determine suitable for high performance of one or more software applications executing at the information handling system 300 to work with the one or more wireless IO device in an embodiment as described below. For example, in existing systems that only allow for transmission of data packets limited to 8 bytes, the data packet report rate and the wireless communication adapter/dongle report rate may be equivalent to one another and may be limited as such. This may be the case because each data packet being limited to 8 bytes further limits each data packet to carrying a single pair of coordinates or positional information for a wireless mouse. However, the orchestration of data packets transmitted from one or more wireless IO devices 380 to the wireless communication adapter/dongle 330 or wireless radio system of the information handling system 300 executing code instructions of the IO device wireless communication packet polling and reception system allows for the transmission of data packets having more than 8 bytes, such as 16 bytes or 32 bytes and may allow a different selected number of packets in response to a polling packet. This provides for tuning of selected number of data packets or selected data packet lengths to accommodate using split bytes with guarding bits when data packet error rates are detected or to make adjustments for wireless IO device performance purposes such as report rates, throughput, latency or the like.

For example, each data packet may include more than one pair of coordinates or positional information of the wireless mouse 380. This may increase the wireless communication adapter/dongle report rate (e.g., speed at which a wireless mouse 380 transmits each positional measurement) without increasing the data packet transmission rate (e.g., speed at which each data packet is transmitted). This allows for fine-tuning of the wireless IO device data packet number and length to accommodate wireless IO device prioritized performance metrics for the wireless IO mouse 380 to meet priority requirements for specific software applications executing at the information handling system 300 as well as operate dynamically to utilize split bytes with guarding bits when conditions are detected according to embodiments herein.

Performance based adjustments to selected number of data packets and selected data packet length may be gauged according to one or more wireless IO device prioritized performance metrics stored within one or more performance policies for the wireless IO device (e.g., mouse 380) at the wireless communication adapter/dongle 330 or the wireless communications radio system for the information handling system 300 in some example embodiments. For example, some software applications may be associated with a developer-specified or user-specified highest priority wireless IO device prioritized performance metric for low latency between transmission of a first data packet (e.g., 350) within consecutive data packet communication frames (e.g., following the updated polling packet 370). As another example, some software applications may be associated with a developer-specified or user-specified highest priority wireless IO device prioritized performance metric for a high data packet transmission rate identifying a speed at which data packets may be received at the wireless communication adapter/dongle 330 or a wireless radio system of the information handling system 300. As yet another example, some software applications may be associated with a developer-specified or user-specified highest priority wireless IO device prioritized performance metric for a high speed at which a wireless mouse 380 transmits each positional measurement of the mouse 380 to the wireless dongle 330 or wireless radio system of the information handling system 300 also referred to as a wireless communication adapter/dongle report rate or a wireless communication radio system report rate.

In some cases, developers or users may prioritize one of these wireless IO device prioritized performance metrics (e.g., low inter-frame latency, high data packet transmission rate, or high wireless communication adapter/dongle report rate) over the other. For example, gaming software applications may prioritize a high wireless communication adapter/dongle report rate over low inter-frame latency or high data packet transmission rate. In other cases, for other types of software applications, the opposite may be true. For example, developers or users of computer graphics generation applications may prioritize a low inter-frame latency over a high wireless communication adapter/dongle report rate or high data packet transmission rate. As another example, a software update application may prioritize a high data packet transmission rate over a high wireless communication adapter/dongle report rate or a low inter-frame latency.

In still other cases, the developer or the user may provide one or more of a maximum inter-frame latency threshold, a minimum data packet transmission rate threshold, or a minimum dongle report rate threshold to ensure user satisfaction during execution of the software application and ensure reliability of received data from the wireless IO device 380 even while another wireless IO device prioritized performance metric may be prioritized. Each of these wireless IO device prioritized performance metrics and applicable threshold values (e.g., maximum inter-frame latency threshold, minimum data packet transmission rate threshold, or minimum dongle report rate threshold) may be stored in a performance policy for the wireless IO device (e.g., 380) and may be matched with requirements for executing software applications.

Upon pairing of a wireless IO device 380 with the wireless communication adapter/dongle 330 or wireless radio system of the information handling system 300 in an embodiment, a controller for the wireless communication adapter/dongle 330 or wireless radio system of the information handling system 300 may execute code instructions of the IO device wireless communication packet polling and reception system to identify one or more software applications currently executing at the information handling system 300 with IO device wireless prioritized performance metrics that are stored within the performance policy for the paired wireless IO device 380. In an embodiment, the performance policy for the wireless IO device 380 may identify one or more wireless IO device prioritized performance metrics and the identification of the executing software application may determine priority for one over the other, if applicable, based on the identified software application currently executing at the information handling system 300.

A controller for the wireless communication adapter/dongle 330 or wireless communication radio system for the information handling system 300 in an embodiment may access an estimated wireless IO device data packet communication performance table stored in firmware for the controller to identify a wireless IO device application suited data packet number as a selected packet number and a wireless IO device application suited data packet length as a selected packet length that are estimated to meet the software application specific wireless IO device prioritized performance metrics identified within the performance policy for the paired wireless IO device 380. Each combination of a wireless IO device application suited data packet number and a wireless IO device application suited data packet length may be associated with an estimated inter-frame latency value, an estimated dongle report rate, and an estimated data packet transmission rate. In addition, each combination of a wireless IO device application suited data packet number and a wireless IO device application suited data packet length may be referred to herein as a data packet communication frame profile. For example, the estimated wireless IO device data packet communication performance table given directly below may provide estimated values for wireless communication adapter/dongle report rate, estimated wireless IO device data packet transmission rate value, and latency between transmission of the first packet within consecutive data packet communication frames (e.g., inter-frame latency) for the mouse 380 based on various combinations of wireless IO device data packet number and data packet length (e.g., data packet communication frame profiles) in one embodiment:

TABLE 1

ESTIMATED WIRELESS IO DEVICE DATA PACKET COMMUNICATION PERFORMANCE TABLE

| Data packet communication frame profile: Wireless IO device Data Packet Number (N) and Wireless IO Device Data Packet Length (M) | Estimated Wireless IO Device Data Packet Transmission Rate Value | Estimated Inter-Frame Latency Value | Estimated Dongle Report Rate Value (Positional Measurements Received Per Second) |
|---|---|---|---|
| N = 1<br>M = 8 bytes | 4,000 Hz | 250 μs | 4,000 |
| N = 2<br>M = 8 bytes | 5,300 Hz | 370 μs | 5,300 |
| N = 3<br>M = 8 bytes | 6,060 Hz | 486 μs | 6,060 |
| N = 4<br>M = 8 bytes | 6,300 Hz | 610 μs | 6,300 |
| N = 1<br>M = 16 bytes | 3,500 Hz | 280 μs | 7,000 |
| N = 2<br>M = 16 bytes | 4,500 Hz | 435 μs | 8,000+ |
| N = 3<br>M = 16 bytes | 5,050 Hz | 585 μs | 8,000+ |
| N = 4<br>M = 16 bytes | 5,200 Hz | 750 μs | 8,000+ |

The estimated inter-frame latency values, estimated wireless IO device data packet transmission rate, and estimated dongle report rate values shown in the estimated wireless IO device data packet communication performance table above are but one example and may be determined in some embodiments based on experimental testing of communications between the wireless mouse 380 and the wireless communication adapter/dongle 330 or the wireless radio system of the information handling system 300, for example. The estimated wireless IO device data packet communication performance table may be stored in flash memory or other memory and sued with firmware for the controller of the wireless communication adapter/dongle 330 or the wireless radio system for the information handling system 300 in an embodiment. As shown in the estimated wireless IO device data packet communication performance table, increasing the wireless IO device data packet number (e.g., number of data packets transmitted within each data packet communication frame (e.g., 340) in an embodiment may generally increase the estimated inter-frame latency value. As also shown in the estimated wireless IO device data packet communication performance table, increasing the wireless IO device data packet length or wireless IO device data packet number may generally result in a higher estimated dongle report rate value. In some cases, the estimated inter-frame latency value or the estimated dongle report rate value may be constricted by limitations on hardware operably connected to the wireless communication adapter/dongle 330 or the wireless radio system of the information handling system 300. For example, the estimated dongle report rate value associated with wireless IO device data packet length of 16 bytes and wireless IO device data packet numbers above one may be limited to 8,000 positional measurements per second (Hz) due to constricted performance of the Universal Serial Bus (USB) connecting the dongle 330 or the wireless radio system to the information handling system 300. Thus, as the capabilities of the USB standards increase, so too may the estimated dongle report rate values within the estimated wireless IO device data packet communication performance table, depending on the varying payload counts or packet lengths used in data responses to a polling packet.

The controller for the wireless communication adapter/dongle 330 or the wireless radio system of the information handling system 300 in an embodiment may access the estimated wireless IO device data packet communication performance table and any performance policies for the wireless IO device 380 to determine the wireless IO device application suited data packet number and wireless IO device application suited data packet length best suited for high performance of the wireless IO device 380 as required for execution of an identified software application at the information handling system 300. This determination may be made in an embodiment based on a prioritization of one performance metric (e.g., low inter-frame latency, high wireless IO device data packet transmission rate, or high wireless communication adapter/dongle report rate) over another during execution of the specifically identified software application currently executing at the information handling system 300.

For example, a software application such as a first-person shooter gaming application may prioritize high wireless communication adapter/dongle report rate over low inter-frame latency or wireless IO device data packet transmission rate in an embodiment. As another example, another software application, such as computer graphics generation application may prioritize low inter-frame latency over high wireless communication adapter/dongle report rate or high wireless IO device data packet transfer rate. In still another example embodiment, another software application, such as a software update application may prioritize high wireless IO device data packet transfer rate over low inter-frame latency or high wireless communication adapter/dongle report rate.

As described directly above, adjusting the wireless IO device data packet number or length to tailor one of these wireless IO device prioritized performance metrics (e.g., inter-frame latency) for high performance of an executing software application may cause a corresponding decrease in suitability of another prioritized performance metric (e.g., dongle report rate) for execution of the software application. For example, increasing the wireless IO device data packet number in an embodiment may increase the wireless IO device data packet transmission rate and the wireless communication adapter/dongle report rate which may be well suited for execution of the software application, but may also increase the inter-frame latency, which may be ill-suited for execution of the software application, as shown in the estimated wireless IO device data packet communication performance table. Thus, these wireless IO device prioritized performance metrics (e.g., low or minimized inter-frame latency, high or maximized wireless IO device data packet transmission rate, and high or maximized dongle report rate) may be associated with competing needs. The controller for the wireless communication adapter/dongle 330 or the wireless radio system of the information handling system 300 in an embodiment may reference the performance policy for the specific wireless IO device 380 to determine which of these performance metrics is prioritized over the other in order to choose a wireless IO device application suited data packet number and length tailored specifically to the currently executing software application and its requirements for suitable performance.

For example, in an embodiment in which the IO device prioritized performance metric of interest is a low inter-frame latency, the controller for the wireless communication adapter/dongle or wireless radio system for an information handling system executing code instructions of the IO device wireless communication packet polling and reception system may identify a data packet communication frame profile that selects a data packet number of one and a data packet length of 8 Bytes as a potential candidate profile best suited for transceiving of data packets between the wireless IO device 380 and the wireless communications dongle 330 during execution of the identified software application (e.g., computer graphics generation application). Such a data packet communication frame profile may be associated with a lowest possible inter-frame latency of 250 µs, within the estimated wireless IO device data packet communication performance table (Table 1), for example.

As another example, in an embodiment in which the IO device prioritized performance metric of interest is a high dongle report rate, the controller for the wireless communication adapter/dongle or wireless radio system for an information handling system executing code instructions of the IO device wireless communication packet polling and reception system may identify a data packet communication frame profile that selects a data packet number of two, three, or four and a data packet length of 16 Bytes as potential candidate profiles best suited for transceiving of data packets between the wireless IO device 380 and the wireless communications dongle 330 during execution of the identified software application (e.g., gaming application). Such data packet communication frame profiles may be associated with a highest possible dongle report rate of 8,000 Hz within the estimated wireless IO device data packet communication performance table, for example.

In still another example, in an embodiment in which the IO device prioritized performance metric of interest is a high data packet transmission rate, the controller for the wireless communication adapter/dongle or wireless radio system for an information handling system executing code instructions of the IO device wireless communication packet polling and reception system may identify a data packet communication frame profile that selects a data packet number of four and a data packet length of 8 Bytes as a potential candidate profile best suited for transceiving of data packets between the wireless IO device 380 and the wireless communications dongle 330 during execution of the identified software application (e.g., software update application). Such data packet communication frame profiles may be associated with a highest possible data packet transmission rate of 6,300 Hz within the estimated wireless IO device data packet communication performance table, for example.

The controller for the wireless communication adapter/dongle 330 or wireless radio system for an information handling system 300 executing code instructions of the IO device wireless communication packet polling and reception system in an embodiment may determine whether more than one potential candidate profile has been identified as suitable for transceiving of data packets between the wireless IO device 380 and the wireless communications dongle 330 during execution of the identified software application. For example, in an embodiment in which the IO device prioritized performance metric of interest is a low inter-frame latency, a single data packet communication frame profile that selects a data packet number of one and a data packet length of 8 Bytes may have been identified as a potential candidate profile best suited for transceiving of data packets between the wireless IO device 380 and the wireless communications dongle 330 during execution of the identified software application (e.g., computer graphics generation application). As another example, in an embodiment in which the IO device prioritized performance metric of interest is a high data packet transmission rate, a single data packet communication frame profile that selects a data packet number of four and a data packet length of 8 Bytes may have been identified as a potential candidate profile best suited for transceiving of data packets between the wireless IO device 380 and the wireless communications dongle 330 during execution of the identified software application (e.g., software update application).

If a single potential candidate data packet communication frame profile has been identified, such as in the embodiments described directly above, this single data packet communication frame profile may be used to select the wireless IO device application suited data packet number and the wireless IO device application suited data packet length. For example, in an embodiment in which the IO device prioritized performance metric of interest is a low inter-frame latency, the wireless IO device application suited data packet number of one may be selected and the wireless IO device application suited data packet length of 8 Bytes may be selected for transceiving of data packets between the wireless IO device 380 and the wireless communications dongle 330 during execution of the identified software application (e.g., computer graphics generation application). As another example, in an embodiment in which the IO device prioritized performance metric of interest is a high data packet transmission rate, the wireless IO device application suited data packet number of four may be selected and the wireless IO device application suited data packet length of 8 Bytes may be selected for transceiving of data packets between the wireless IO device 380 and the wireless communications dongle 330 during execution of the identified software application (e.g., computer graphics generation application).

If more than one potential candidate data packet communication frame profile has been identified, there may be a need to narrow down the potential candidates to a single data packet communication frame profile. For example, in an embodiment in which the IO device prioritized performance metric of interest is a high dongle report rate, a plurality of data packet communication frame profiles that select a data packet number of two, three, or four and a data packet length of 16 Bytes may have been identified as potential candidate profiles best suited for transceiving of data packets between the wireless IO device 380 and the wireless communications dongle 330 during execution of the identified software application (e.g., gaming application). In such a case, the controller for the wireless communication adapter/dongle 330 or wireless radio system for an information handling system 300 executing code instructions of the IO device wireless communication packet polling and reception system may refer to the wireless IO device 380 performance policy to determine if the user or developer of the software application determined to be currently executing at the information handling system 300 has identified a second wireless IO device prioritized performance metric (e.g., one having a lower priority, but still identified as impacting performance of the currently executing software application). If no other wireless IO device prioritized performance metrics are associated with the identified software application, the controller for the wireless communication adapter/dongle 330 or wireless radio system for an information handling system 300 executing code instructions of the IO device wireless communication packet polling and reception system in an embodiment may select the wireless IO device application suited packet number and wireless IO device application suited packet length from any of the potential candidate data packet communication frame profiles identified above.

In some embodiments, other wireless IO device prioritized performance metrics may also be associated with the identified software application. For example, in an embodiment in which high dongle report rate was identified a highest prioritized wireless IO device prioritized performance metric, a second wireless IO device prioritized performance metric for the identified software application may be identified by a user or developer of the identified software application as impacting performance of the software application, although having a lower priority than the high dongle report rate. In one such example embodiment, a low inter-frame latency may be given as such a second wireless IO device prioritized performance metric for the identified software application. In such an example embodiment, the controller for the wireless communication adapter/dongle 330 or wireless radio system for an information handling system 300 executing code instructions of the IO device wireless communication packet polling and reception system may select a wireless IO device application suited data packet number of two and a wireless IO device application suited data packet length of sixteen Bytes, associated with a lowest inter-frame latency of 435 µs (in comparison to other candidate data packet communication frame profiles having a dongle report rate of 8,000 Hz) as best suited for transceiving of data packets between the wireless IO device 380 and the wireless communications dongle 330 during execution of the identified software application.

In another such example embodiment, a high data packet transmission rate may be given as such a second wireless IO device prioritized performance metric for the identified software application. In such an example embodiment, the controller for the wireless communication adapter/dongle 330 or wireless radio system for an information handling system 300 executing code instructions of the IO device wireless communication packet polling and reception system may select a wireless IO device application suited data packet number of four and a wireless IO device application suited data packet length of sixteen Bytes, associated with a highest data packet transmission rate of 5,200 Hz (in comparison to other candidate data packet communication frame profiles having a dongle report rate of 8,000 Hz) as best suited for transceiving of data packets between the wireless IO device 380 and the wireless communications dongle 330 during execution of the identified software application.

In some embodiments, the controller for the wireless communication adapter/dongle 330 or the wireless radio system of the information handling system 300 in an embodiment may reference the performance policy for the specific wireless IO device 380 to identify any minimum or maximum thresholds for the wireless IO device prioritized performance metrics (e.g., inter-frame latency, wireless IO device data packet transmission rate, or wireless communication adapter/dongle report rate). For example, the controller for the wireless communication adapter/dongle 330 or the wireless radio system of the information handling system 300 in an embodiment may reference the performance policy for the specific wireless IO device 380 to identify a maximum inter-frame latency threshold of 500 µs or 600 µs in various embodiments that may be tolerable. As another example, the controller for the wireless communication adapter/dongle 330 or the wireless radio system of the information handling system 300 in an embodiment may reference the performance policy for the specific wireless IO device 380 to identify a minimum data packet transmission rate threshold of 4,000 Hz or 5,000 Hz that may be required by specification in various embodiments. In still another example, the controller for the wireless communication adapter/dongle 330 or the wireless radio system of the information handling system 300 in an embodiment may reference the performance policy for the specific wireless IO device 380 to identify a minimum dongle report rate threshold of 5,000 Hz, 6,000 Hz, or 8,000 Hz, as required by specification or is required in various embodiments.

The controller for the wireless communication adapter/dongle 330 or the wireless radio system of the information handling system 300 may execute code instructions of the IO device wireless communication packet polling and reception system to determine a wireless IO device application suited data packet number and wireless IO device application suited data packet length based on these minimum and maximum threshold values in some embodiments. For example, in some embodiments, the performance policy for the wireless mouse 380 may prioritize low inter-frame latency over high wireless communication adapter/dongle report rate or high wireless IO device data packet transmission rate. In one such example embodiment, the performance policy for the wireless mouse 380 may also identify a minimum dongle report rate threshold of 5,000 Hz and a minimum data packet transmission rate threshold of 5,000 Hz. In such a case, the controller for the wireless communication adapter/dongle 330 or the wireless radio system of the information handling system 300 executing code instructions of the IO device wireless communication packet polling and reception system may access the estimated wireless IO device data packet communication performance table above to identify as best suited for execution of a specific software application the combination of wireless IO data packet number (N) and wireless IO data packet length (M) with a minimum packet number that is capable of meeting the minimum dongle report rate threshold and the minimum data packet transmission rate threshold as IO device wireless prioritized performance metrics for an executing software application. More specifically, the controller for the wireless communication adapter/dongle 330 or the wireless radio system of the information handling system 300 executing code instructions of the IO device wireless communication packet polling and reception system may access the estimated wireless IO device data packet communication performance table above to identify a wireless IO device application suited data packet number of 2, and a wireless IO device application suited data packet length of 8 bytes, to give an estimated data packet transmission rate of 5,300 Hz (e.g., exceeding the minimum data packet transmission rate threshold of 5,000 Hz) and an estimated dongle report rate of 5,300 (e.g., exceeding the minimum dongle report rate threshold of 5,000 Hz) in one example embodiment. This may yield an estimated inter-frame latency value of 380 μs in an embodiment.

In another example embodiment, in which the performance policy for the wireless mouse 380 may prioritize low inter-frame latency over high wireless communication adapter/dongle report rate or high wireless IO device data packet transmission rate as a wireless IO device prioritized performance metric for a detected, executing software application, the performance policy for the wireless mouse 380 may also identify a minimum dongle report rate threshold of 6,000 Hz and a minimum data packet transmission rate threshold of 5,000 Hz. In such a case, the controller for the wireless communication adapter/dongle 330 or the wireless radio system of the information handling system 300 executing code instructions of the IO device wireless communication packet polling and reception system may access the estimated wireless IO device data packet communication performance table above to identify a wireless IO device application suited data packet number of 3, and a wireless IO device application suited data packet length of 16 bytes, to give an estimated data packet transmission rate of 5,050 Hz (e.g., exceeding the minimum data packet transmission rate threshold of 5,000 Hz) and an estimated dongle report rate of 8,000 (e.g., exceeding the minimum dongle report rate threshold of 6,000 Hz). This may yield an estimated inter-frame latency value of 585 μs in an embodiment as meeting the wireless IO device prioritized performance metric for a detected, executing software application.

As another example embodiment, the performance policy for the wireless mouse 380 may prioritize high wireless communication adapter/dongle report rate over low inter-frame latency or high wireless IO device data packet transmission rate as a wireless IO device prioritized performance metric for a detected, executing software application. In one such example embodiment, the performance policy for the wireless mouse 380 may also identify a maximum inter-frame latency threshold of 500 μs and a minimum data packet transmission rate threshold of 4,000 Hz. In such a case, the controller for the wireless communication adapter/dongle 330 or the wireless radio system of the information handling system 300 executing code instructions of the IO device wireless communication packet polling and reception system may access the estimated wireless IO device data packet communication performance table above to identify as best suited for execution of a specific software application the combination of wireless IO data packet number (N) and wireless IO data packet length (M) with a maximum packet length that is capable of meeting the maximum inter-frame latency threshold and the minimum data packet transmission rate threshold. More specifically, the controller for the wireless communication adapter/dongle 330 or the wireless radio system of the information handling system 300 executing code instructions of the IO device wireless communication packet polling and reception system may access the estimated wireless IO device data packet communication performance table (Table 1) above to identify a wireless IO device application suited data packet number of 2, and a wireless IO device application suited data packet length of 16 bytes, to give an estimated data packet transmission rate of 4,500 Hz (e.g., exceeding the minimum data packet transmission rate threshold of 4,000 Hz) and an estimated inter-frame latency value of 435 μs (e.g., below the maximum inter-frame latency threshold of 500 μs). This may yield an estimated dongle report rate of up to 8,000 Hz in an embodiment that meets the wireless IO device prioritized performance metrics for a detected software application.

In another example embodiment, in which the performance policy for the wireless mouse 380 may prioritize high wireless communication adapter/dongle report rate over low inter-frame latency or high wireless IO device data packet transmission rate, the performance policy for the wireless mouse 380 may also identify a maximum inter-frame latency threshold of 600 μs and a minimum data packet transmission rate threshold of 5,000 Hz as additional wireless IO device prioritized performance metrics for a detected, executing software application. In such a case, the controller for the wireless communication adapter/dongle 330 or the wireless radio system of the information handling system 300 executing code instructions of the IO device wireless communication packet polling and reception system may access the estimated wireless IO device data packet communication performance table (Table 1) above to identify a wireless IO device application suited data packet number of 3, and a wireless IO device application suited data packet length of 16 bytes, to give an estimated data packet transmission rate of 5,050 Hz (e.g., exceeding the minimum data packet transmission rate threshold of 5,000 Hz) and an estimated inter-frame latency value of 585 µs (e.g., falling below the maximum inter-frame latency threshold of 600 µs). This may yield an estimated dongle report rate of up to 8,000 Hz in an embodiment, as suitable or required for an executing software application.

As yet another example, in some embodiments, the performance policy for the wireless mouse 380 may prioritize high wireless IO device data packet transmission rate over low inter-frame latency or high wireless communication adapter/dongle report rate as a wireless IO device prioritized performance metric for a detected, executing software application. In one such example embodiment, the performance policy for the wireless mouse 380 may also identify a maximum inter-frame latency threshold of 500 µs and a minimum dongle report rate threshold of 6,000 Hz as additional wireless IO device prioritized performance metrics to limit selection of a packet frame number of packets or packet length to preserve other baseline performance requirements. In such a case, the controller for the wireless communication adapter/dongle 330 or the wireless radio system of the information handling system 300 executing code instructions of the IO device wireless communication packet polling and reception system may access the estimated wireless IO device data packet communication performance table (Table 1) above to identify as best suited for execution of a specific software application the combination of wireless IO data packet number (N) and wireless IO data packet length (M) with a maximum packet number that is capable of meeting the maximum inter-frame latency threshold and the minimum data packet transmission rate threshold. More specifically, the controller for the wireless communication adapter/dongle 330 or the wireless radio system of the information handling system 300 executing code instructions of the IO device wireless communication packet polling and reception system may access the estimated wireless IO device data packet communication performance table above to identify a wireless IO device application suited data packet number of 3, and a wireless IO device application suited data packet length of 8 bytes, to give an estimated dongle report rate of 6,060 Hz (e.g., exceeding the minimum dongle report rate threshold of 6,000 Hz) and an estimated inter-frame latency value of 486 µs (e.g., exceeding the maximum inter-frame latency threshold of 500 µs). This may yield an estimated data packet transmission rate of up to 6,060 Hz in an embodiment to meet a suitable wireless IO device prioritized performance metric for a detected software application.

In another example embodiment, the performance policy for the wireless mouse 380 may prioritize high wireless communication adapter/dongle report rate over high wireless IO device data packet transmission rate and low inter-frame latency or high wireless communication adapter/dongle report rate. The performance policy for the wireless mouse 380 may also identify a maximum inter-frame latency threshold of 500 µs and a minimum dongle report rate threshold of 8,000 Hz as additional wireless IO device prioritized performance metrics to limit selection of a packet frame number of packets or packet length to preserve other baseline performance requirements. In such a case, the controller for the wireless communication adapter/dongle 330 or the wireless radio system of the information handling system 300 executing code instructions of the IO device wireless communication packet polling and reception system may access the estimated wireless IO device data packet communication performance table above to identify a wireless IO device application suited data packet number of 2, and a wireless IO device application suited data packet length of 16 bytes, to give an estimated dongle report rate of up to 8,000 Hz (e.g., meeting the minimum dongle report rate threshold of 8,000 Hz) and an estimated inter-frame latency value of 435 µs (e.g., falling below the maximum inter-frame latency threshold of 500 µs). This may yield an estimated wireless communication dongle report rate of 8,000 Hz in an embodiment to meet a suitable wireless IO device prioritized performance metric for a detected software application. In such a way, the IO device wireless communication packet polling and reception system may tailor the selected number of packets and selected packet lengths identified within these polling packets for high performance of one or more software applications executing at the information handling system for example.

The controller of the wireless communication adapter/dongle 330 or the information handling system 300 may instruct the wireless radio system to transmit an initial polling packet 320 containing the selected data packet number, the selected data packet length, and the data packet transmission time slots to be used. This initial polling packet 320 in an embodiment may synchronize communication between the wireless communication adapter/dongle 330 or the information handling system 300 and the wireless IO device 380 for a data packet communication frame beginning at a selected time and having the selected duration (e.g., 0.0138 seconds). Further, this initial polling packet 320 may include instructions to the guarding bit data packet self-recover system agent utilize split bytes with guarding bits inserted when conditions are detected for transmission of data packets in the data packet communication frame 340 according to embodiments herein. Upon transmission of the initial polling packet 320 in an embodiment, the controller for the wireless communication adapter/dongle 330 or the information handling system 300 may switch the wireless radio system into a receive mode to await the beginning of the data packet communication frame with the wireless IO device 380.

At the time specified within the initial polling packet 320 in an embodiment, the data packet communication frame 340 may begin with receipt of a first packet 350 responsive to the initial polling packet 320 from the wireless IO device 380. In an embodiment, the first packet 350 for the data packet communication frame 340 may adhere to the instructions received within the initial polling packet 320, including any instructions to use split bytes with guarding bits. For example, in an embodiment, the first packet 350 may have a selected length equivalent to the initial wireless IO device application suited data packet length of 32 Bytes to accommodate split bytes with guarding bits inserted for 16 Bytes of wireless IO device data from the wireless IO device. Such wireless IO device data and any split bytes may be delivered at the synchronized time designating the beginning of the data packet communication frame 340 within the first of the selected number (e.g., four as shown) of data packets in data packet transmission time slots, as defined within the initial polling packet 320. In other embodiments, the guarding bit data packet self-recovery system may utilize an adjusted selected number of data packets to accommodate split bytes with guarding bits for transmission of data via the responsive data packet communication frame 340.

A microcontroller executing code instructions of the IO device wireless communication packet polling and reception system at the wireless communication adapter/dongle 330 or the information handling system 300 may ensure that, during this data packet communication frame 340, the wireless radio system remains in a receive mode to receive the selected number of data packets at the selected data packet lengths from the one or more paired wireless IO devices (e.g., 380) during the anticipated duration of the data packet communication frame 340. In other words, the controller of the wireless communication adapter/dongle 330 or the information handling system 300 may avoid any power loss, data rate transmission delay, or inadvertent data packet collision threat due to rapid switching between RX/TX modes during this data packet communication frame 340. In one embodiment, during the data packet communication frame 340 in an embodiment, the wireless radio system of the wireless communication adapter/dongle 330 or the information handling system 300 may receive a plurality of data packets with a selected data packet number, a selected data packet length, or both as defined within the initial polling packet 320. The selected data packet number or selected data packet length may accommodate split data bytes with guarding bits inserted when error conditions are detected in some embodiments or the are otherwise suited to the wireless IO device performance such as with a detected software application and wireless IO device prioritized performance metric for that software application in various embodiments herein.

For example, in one embodiment in which the initial polling packet 320 identified an initial, selected wireless IO device application suited data packet number of four, the Nth packet 360 received by the wireless radio system of the wireless communication adapter/dongle 330 or the information handling system 300 may be the fourth of four data packets transmitted during the data packet communication frame 340 from the wireless IO device 380 to the wireless communication adapter/dongle 330 or the information handling system 300. Each of the four data packets transmitted to the wireless communication adapter/dongle 330 or the information handling system 300 in an embodiment may also have the initial, selected data packet length (e.g., 32 bytes) that is suited accommodate the requirement for split bytes with guarding bits inserted instructed from execution of the guarding bit data packet self-recovery system. These 32 byte selected data packet length will include split bytes to provide for 16 bytes of wireless IO device data with guarding bits for each byte providing for self-recovery. Further, the selected data packet number and selected data packet length may be also suited to a detected software application and wireless IO device prioritized performance metrics for that software application and may be transmitted at the designated data packet transmission time slots identified within the initial polling packet 320.

As described in one embodiment herein, each data packet may comprise one or more pairs of positional coordinates for a mouse that is wireless IO device 380, depending on the initial, selected data packet length suited to a detected software application wireless IO device prioritized performance metric. For example, each pair of positional coordinates for the mouse 380 may comprise 8 bytes, such that a data packet having an initial, selected wireless IO device application suited data packet length of 8 bytes includes one pair of positional coordinates, while an initial, selected wireless IO device application suited data packet length of 16 bytes may include two pairs of positional coordinates for the mouse that is wireless IO device 380. When execution of the guarding bit data packet self-recovery system instructs use of split bytes with guarding bits inserted for data packet error mitigation, the selected data packet length may be adjusted to 32 bytes while that data packet error mitigation measure is being implemented.

Following the data packet communication frame 340, the controller of the wireless communication adapter/dongle 330 or the information handling system 300 may switch the wireless radio system to a transmit mode for further synchronizing future data packet communication frames and also acknowledging receipt or missed packets from a previous data packet communication frame. The controller may execute code instructions of the IO device wireless communication packet polling and reception system in an embodiment to generate and transmit an updated polling packet 370. In one embodiment, such an updated polling packet 370 may include an acknowledgement header (ACK) identifying the number (N) of packets received during the data packet communication frame 340. For example, in an embodiment in which the Nth packet 360 is the fourth of four packets allotted to the wireless IO device 380 for transmission within the data packet communication frame 340 within the initial polling packet 320, such an updated polling packet 370 may acknowledge receipt of four data packets.

The updated polling packet 370 in an embodiment may further include updated instructions for synchronizing transmission of data packets within a second, later data packet communication frame. For example, the updated polling packet 370 may, at the very least, provide an updated time for initiation of such a second, later data packet communication frame. In such an embodiment, the updated polling packet 370 may or may not further adjust one or more of the selected data packet number, selected data packet length, or the data packet transmission time slots for the wireless IO device 380 to meet the wireless IO device prioritized performance metric for a detected software application that is currently executing. For example, in an embodiment, the updated polling packet 370 identifying an updated time for initiation of a second, later data packet communication frame may also provide an updated selected data packet number equivalent to the initial selected data packet number. In another example, in an embodiment, the updated polling packet 370 may also provide an updated selected data packet length equivalent to the initial selected data packet length. In still another example, in an embodiment, the updated polling packet 370 may also provide updated selected data packet time slots having the same positions within the second data packet communication frame as the positions of the initial data packet transmission time slots within the first data packet communication frame 340.

In other embodiments, one or more of these values for the updated selected data packet number, updated selected data packet length, or updated selected data packet transmission time slots may be changed or adjusted from the values of the initial selected data packet number, initial selected data packet length, or initial selected data packet transmission time slots given within the initial polling packet 320 by the wireless IO device (e.g., 380) to meet a change in the data packet error mitigation measures needed as the detected conditions for RSSI or data packet errors/loss change. In an example embodiment, the guarding bit data packet self-recovery system may determine that use of split bytes with guarding bits is no longer warranted or necessary due to improved conditions not requiring data packet error mitigation. Similarly, the guarding bit data packet self-recovery system may determine that use of split bytes with guarding bits is no longer working when conditions have worsened that require a data packet mitigation measure requiring higher power such as frequency hopping to a different channel or just repeated brute force data packet retransmission requests since the data packet errors may not improve enough with split bytes and guarding bits in some embodiments. For example, use of guarding bits are able to accommodate and provide self-recovery of data bytes in data packets when the data bytes have only 1 or 2 bit errors. While single bit errors are often a majority of the bit errors detected, for example 70%, error levels above in a byte of data that may continue to require data packet retransmission. Thus, using split bytes and the added airtime and power costs incurred may not be effective when larger than 2 bit error levels or lost data packets continue to be the detected problem. In such an embodiment, the updated selected data packet number, updated selected data packet length, or updated selected data packet transmission time slots may be changed or adjusted in a second updated polling packet to dynamically return the selected number of data packets and selected data packet length and turn off using split bytes. Select data packet number and select data packet length may return to levels to accommodate wireless IO device prioritized performance metrics for a detected executing software application or changes in function of the executing software application in an example embodiment.

Transmission of an initial polling packet 320 prior to a scheduled data packet communication frame 340 and transmission of an updated polling packet 370 following the scheduled data packet communication frame 340 for orchestrating an upcoming second data packet communication frame may minimize the number of acknowledgement packets transmitted from the wireless communication adapter/dongle 330 or information handling system 300 and minimize the frequency with which switches between TX mode and RX mode are required. In such a way, the IO device wireless communication packet polling and reception system may decrease the frequency of ACK data packets transmitted, and the frequency of mode-switching described above with respect to existing systems. This may decrease power consumed by rapid mode-switching, reduce latency and improve overall user experience and wireless IO device (e.g., 380) performance and provide tailored performance based on detected executing software applications in various embodiments.

In a further aspect of an embodiment, the controller of the wireless communication adapter/dongle 330 or the information handling system 300 executing code instructions of the IO device wireless communication packet polling and reception system in an embodiment may determine that the wireless IO device 380 has failed to transmit a number of data packets equivalent to the initial wireless IO device application suited data packet number within the initial polling packet 320. This may occur, for example, if the wireless IO device 380 powers down or enters sleep mode during the data packet communication frame 340 from lack of use. In such a scenario, the controller of the wireless communication adapter/dongle 330 or the information handling system 300 executing code instructions of the IO device wireless communication packet polling and reception system in an embodiment may initiate a device responsiveness timer having a preset duration (e.g., two minutes, five minutes, ten minutes). If no further data packets are received from the wireless IO device 380 before the device responsiveness timer expires, this may indicate that the wireless IO device 380 has been powered down or entered a sleep mode. In such a case, the controller of the wireless communication adapter/dongle 330 or the information handling system 300 executing code instructions of the IO device wireless communication packet polling and reception system in an embodiment may terminate the wireless link with the wireless IO device 380 and return to the RX mode to scan multiple frequencies for incoming requests from other wireless IO devices to pair with the wireless communication adapter/dongle 330 or the information handling system 300.

Figure 4:
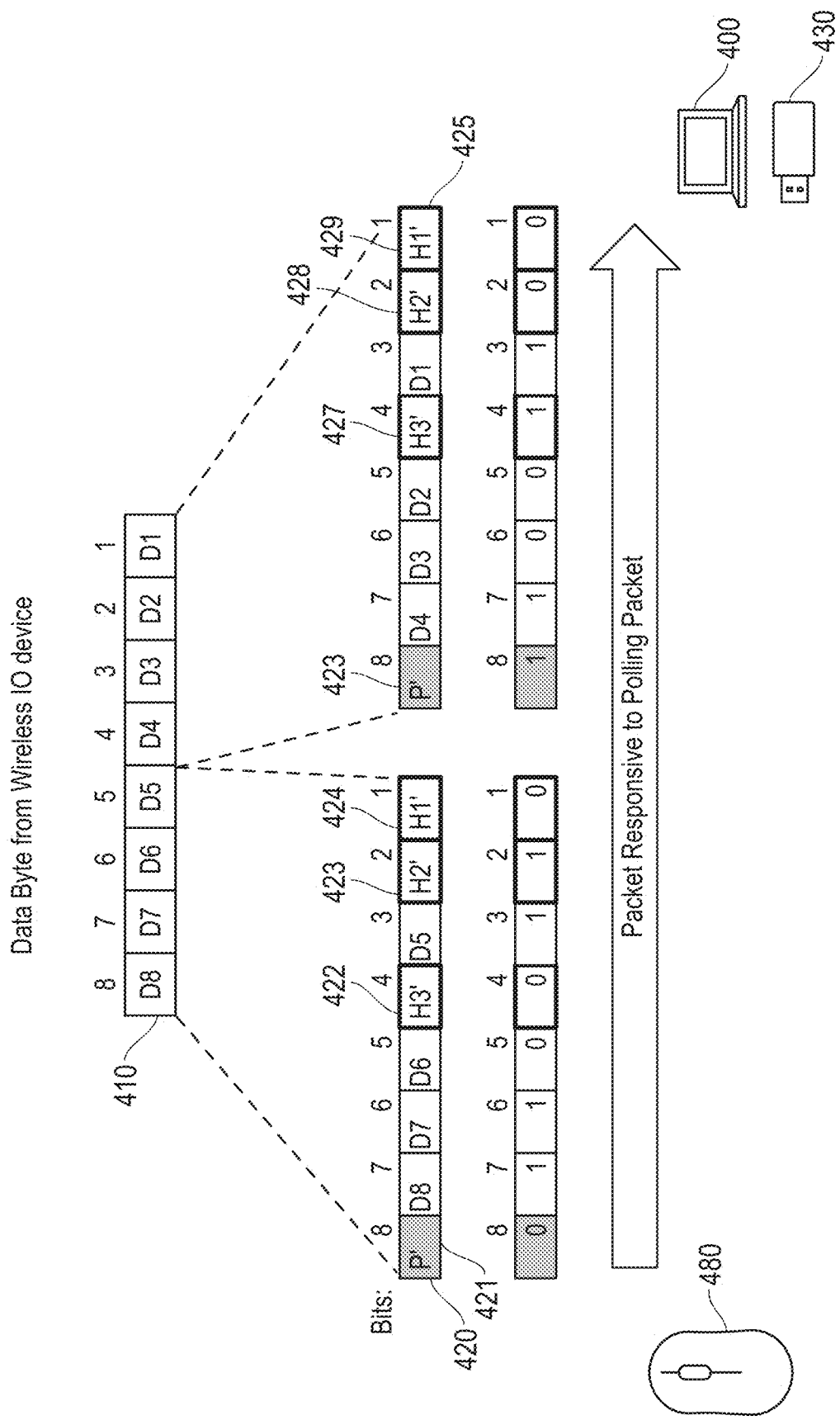
FIG. 4 is a block diagram illustrating a data packet byte split into two bytes with guarding bits for use with a guarding bit data packet self-recovery system for error mitigation in transmission of data packets according to an embodiment of the present disclosure.

FIG. 4 is a block diagram illustrating the execution of instructions of the guarding bit data packet self-recovery system to implement split bytes with guarding bits according to an embodiment of the present disclosure. According to embodiments herein, the guarding bit data packet self-recovery system may determine, based on detected conditions for data packet errors, RSSI levels, and frequency of data packet errors, to select and generate instructions to implement any combination of data packet error mitigation measures. Data packet error mitigation measures may include, depending on detected conditions, issuing data packet retransmission requests, frequency hopping, and the use of split bytes with guarding bits. FIG. 4 illustrates an example of the latter data packet error mitigation measure for use of split bytes with guarding bits inserted according to an embodiment. The data packet error mitigation for wireless IO device data packets including using a guarding bit data packet self-recovery system of FIG. 4 may be used with any wireless IO device communication protocol according to embodiments herein, as described, including with the IO device wireless communication packet polling and reception system in embodiments of the present disclosure orchestrates scheduled delivery of a plurality of data packets from each of one or more wireless IO devices in a data packet communication frame between delivery of ACK data packets according to some embodiments herein.

A data byte at 410 includes 8 bits with wireless IO device data bits D1-D8 at bit positions 1-8. Such wireless IO device data bits may represent data for position pairs from a wireless mouse, keystroke data from a wireless keyboard, position data for a wireless gaming controller, audio data for a wireless headset, or the like. Execution of the guarding bit data packet self-recovery system by the wireless communication dongle microcontroller or another hardware processing resource detects conditions for RSSI noise levels and conditions of data packet errors and error frequency that meet the correct conditions. When a threshold level of data packet error rate has been met, but RSSI noise levels have not exceeded and RSSI noise level threshold, it may be determined that the wireless IO device 480 may be instructed to use split bytes 420, 425 with guarding bits 422, 423, 425 the first split byte 420 and guarding bits 427, 428, 429 in the second split byte 425. Additionally, a parity byte 421 and 426 may be added in each split byte 420, 425 to confirm error has occurred in each split byte. Accordingly, execution of the IO device wireless communication packet polling and reception system with the guarding bit data packet self-recovery system will dynamically adjust a data packet number or data packet length of a data packet communication frame responsive to a polling packet from the wireless IO device 480 to the wireless communication dongle 430 at an information handling system 400. The selected data packet number, selected data packet length, or some combination may be adjusted on the fly by the guarding bit data packet self-recovery system and IO device wireless communication packet polling and reception system according to embodiments herein. The IO device wireless communication packet polling and reception system may expand the selected data packet length instructed for the data packet communication frames to accommodate twice the number of data bytes for the split bytes 420, 425 with inserted guarding bits 422, 423, 424, 427, 428, 429 and parity bits 421, 426 in one example embodiment. The IO device wireless communication packet polling and reception system may expand the selected number of data packets instructed for the data packet communication frames to accommodate twice the number of data bytes for the split bytes 420, 425 with inserted guarding bits 422, 423, 424, 427, 428, 429 and parity bits 421, 426 in another example embodiment.

According to embodiments herein, execution of the guarding bit data packet self-recovery system will determine conditions of RSSI levels for wireless data packet signals on a communication channel or for noise and also data packet errors and data packet error frequencies to determine when to implement the split bytes 420, 425 with inserted guarding bits 422, 423, 424, 427, 428, 429 and parity bits 421, 426. The split bytes 420, 425 with inserted guarding bits 422, 423, 424, 427, 428, 429 and parity bits 421, 426 operate as a data packet mitigation measure and work well to recover broken data bytes with one or two bit errors without requiring costly data re-transmission in near field wireless IO device transmissions. These the split bytes 420, 425 with inserted guarding bits 422, 423, 424, 427, 428, 429 and parity bits 421, 426 work to recover a broken data byte, for example each split byte, for bit errors on the order of magnitude of 1 bit or 2 bits depending on location of both bits in positions on the data byte split into two nibbles of four bits one for each split byte. A single bit error in each nibble may be recoverable over two split-bytes with the guarding bits encoded with a Hamming algorithm as described herein. Since most data byte errors, and thus errors causing a data byte and data packet to be broken or rejected, are single bit errors. Another percentage of errors experienced tend to be no more than 2 bit errors that could occur in one data byte. Thus, when the data packet errors experienced on the byte level are not too large or too frequent so as to require retransmission or even frequency hopping, then the use of the Hamming algorithm encoding with the split bytes 420, 425 and inserted guarding bits 422, 423, 424, 427, 428, 429 may be effective at determining a bit error, its location, and flipping the bit to correct it upon decoding at the wireless communication dongle. Thus, self-recovery of each nibble of four bits in a split data byte is feasible with the Hamming algorithm and the guarding bits upon decoding of the split byte. Upon decoding of the split bytes, whether requiring recovery or not, the nibbles may be reconstituted as a wireless IO device data byte 410 for delivery by the wireless communication dongle to the information handling system and its IO device drivers and executing software applications.

Large or overly frequent data packet errors may be packet loss, byte loss, or larger errant portions of bytes received and be due to chronically high noise levels or other problems with the channel being used to transmit data packet communication frames. Such errors may not be corrected via use of the split bytes 420, 425 with inserted guarding bits 422, 423, 424, 427, 428, 429 and parity bits 421, 426. With this method however, for more common 1 bit or 2 bit errors, the guarding bits or Hamming bits 422, 423, 424, 427, 428, 429 may be used to correct or flip bits that are identified as errant. The parity bits 421, 426 may be used to identify the bit errors in either of the split bytes 420, 425 when they occur to confirm error and ensure that, for example, one of the guarding bits was not in error upon transmission. The wireless communication dongle microcontroller may execute code instructions of the guarding bit data packet self-recovery system to implement a Hamming algorithm with the inserted guarding bits 422, 423, 424, 427, 428, 429 to identify which bit is in error and correct that errant bit to recover the split data byte upon decoding the split byte where an errant bit is detected in embodiments herein.

The wireless IO device 480 and the wireless communication dongle 430 execute the IO device wireless communication packet polling and reception system with the guarding bit data packet self-recovery system to generate split bytes 420 and 425 from the original wireless IO device data byte 410. The wireless IO device data byte 410 is split into two nibbles of four bits which are interspersed into split bytes 420 and 425 and encoded in those bit position under the Hamming algorithm. The first bit D1 of the first nibble of four bits is placed at position 3 in split byte 425 after guarding or Hamming bits H1 429 and H2 428 are placed and encoded at positions 1 and 2. The second third and fourth bits D2, D3, and D4 of the first nibble of four bits are placed at positions 5, 6 and 7 respectively in split byte 425 after another guarding or hamming bit H3 427 is placed and encoded at position 4. The parity bit P 426 is added to the split byte 425 at position 8.

The second split byte 420 includes the fifth bit D5 of the second nibble of four bits at position 3 after guarding or hamming bits H1' 424 and H2' 423 are placed and encoded at positions 1 and 2. The sixth, seventh, and eighth bits D6, D7, and D8 of the second nibble of four bits are placed at positions 5, 6 and 7 respectively the second split byte 420 after another guarding or hamming bit H3' 422 is placed and encoded at position 4. The parity bit P' 421 is also added to the second split byte 420 at position 8.

The parity bits P 426 or P' 421 for each split byte 420 and 425 are used to determine bit errors indicated by a non-zero or odd result of an exclusive-or (XOR) operator among all the bits in the split byte. The guarding bits then also determine non-zero results for subsets of bits among the nibble of bits in the split byte 420, 425 to determine a location of a bit error, if any. The nibble of wireless IO device data in the first split byte 425 requires three guarding bits or hamming bits 429, 428, 427 for coding to cover at least three combinations or sets of the four data bits (H1, D1, D2, D4 and H2, D1, D3, D4 and H3, D2, D3, D4) using an XOR function to cover all data bits with an ability to decode an error and determine location and correction of which location of wireless IO data bit in the first split byte 425 must be corrected. The guarding bits or Hamming bits H1 429, H2 428, and H3 427 are selected and encoded when the split byte is sent by the wireless IO device 480 to make each of the three combinations or sets above to a parity of 0. If upon receipt at the wireless communication dongle 430 of the split byte 425, XOR index operator on any of the three combinations or set results in a parity of 1, that set or combination has a corrupt bit. Execution of the Hamming algorithm in the guarding bit data packet self-recovery system may the determine location of the corrupt bit in the split byte 425. For example, if the first and second set indicate a corrupt bit, such that their indexed XOR operation yields a 1, but the third set does not then D1 is corrupt. If the first and third set indicate a corrupt bit, such that their indexed XOR operation yields a 1, but the second set does not then D2 is corrupt. If the second and third set indicate a corrupt bit, such that their indexed XOR operation yields a 1, but the first set does not then D3 is corrupt. If all three sets indicate a corrupt bit, then D4 is corrupt. Similarly, the nibble of wireless IO device data in the second split byte 420 similarly requires three guarding bits or hamming bits for coding to cover at least three combinations of four data bits (H1', D5, D6, D8 and H2', D5, D7, D8 and H3', D6, D7, D8) using an XOR function to cover all wireless IO device data bits with an ability to decode an error and determine correction of which wireless IO data bit location in the second split byte 420. A similar indexed XOR function as described above may indicate which data bit among D5, D6, D7 or D8 in the second split data byte 420 is corrupt.

As shown in FIG. 4, an example of a raw data byte 410 may be 0xD9 may be encoded into two split bytes as shown 0xE7 and 0xCC with guarding bit encoding as shown. The XOR operator used with the guarding bits and encoded data bits are indexed such that XOR of all bit positions containing a 1 should result in a 0 value if there is no error in particular Hamming coded portions of the split bytes 420, 425. If the indexed XOR of the bit positions is not 0, then it is determined an error of a corrupted bit exists among the indexed bits. The parity bits P 426 and P' 421 for all bits in each split byte 425 and 420 respectively may confirm indication of an error or not is correct and needs to be corrected in an embodiment. Upon determining that a corrupt data bit in a split byte, or two corrupt data bits with one in each split byte 420, 425, has occurred, the location of any corrupt data bits via application of the Hamming algorithm as described above may be determined. Further, in an embodiment the guarding bit data packet self-recovery system upon decoding each split bit under the Hamming algorithm may flip the corrupt bits to correct the byte to bypass any need to send a retransmission request. The guarding bit data packet self-recovery system may then reconstitute the wireless IO device data byte 410 from two split bytes upon decoding and deliver the wireless IO device data byte 410 from the wireless dongle to the information handling system IO device driver and software applications according to embodiments herein. However, more corrupted data bits than one in each split byte 420 or 425 or other data packet errors such as lost packets or lost bytes may not be recoverable with the above. In such a circumstance, the guarding bit data packet self-recovery system may require a retransmission request to be issued or for the wireless dongle to report the data as lost. Thus, embodiments of the guarding bit data packet self-recovery system may also detect severity of radio noise conditions or ongoing frequency of lost packets or other data packet errors, such as due to collision or interference, when selecting among a plurality of data packet error mitigation measures.

Figure 5:
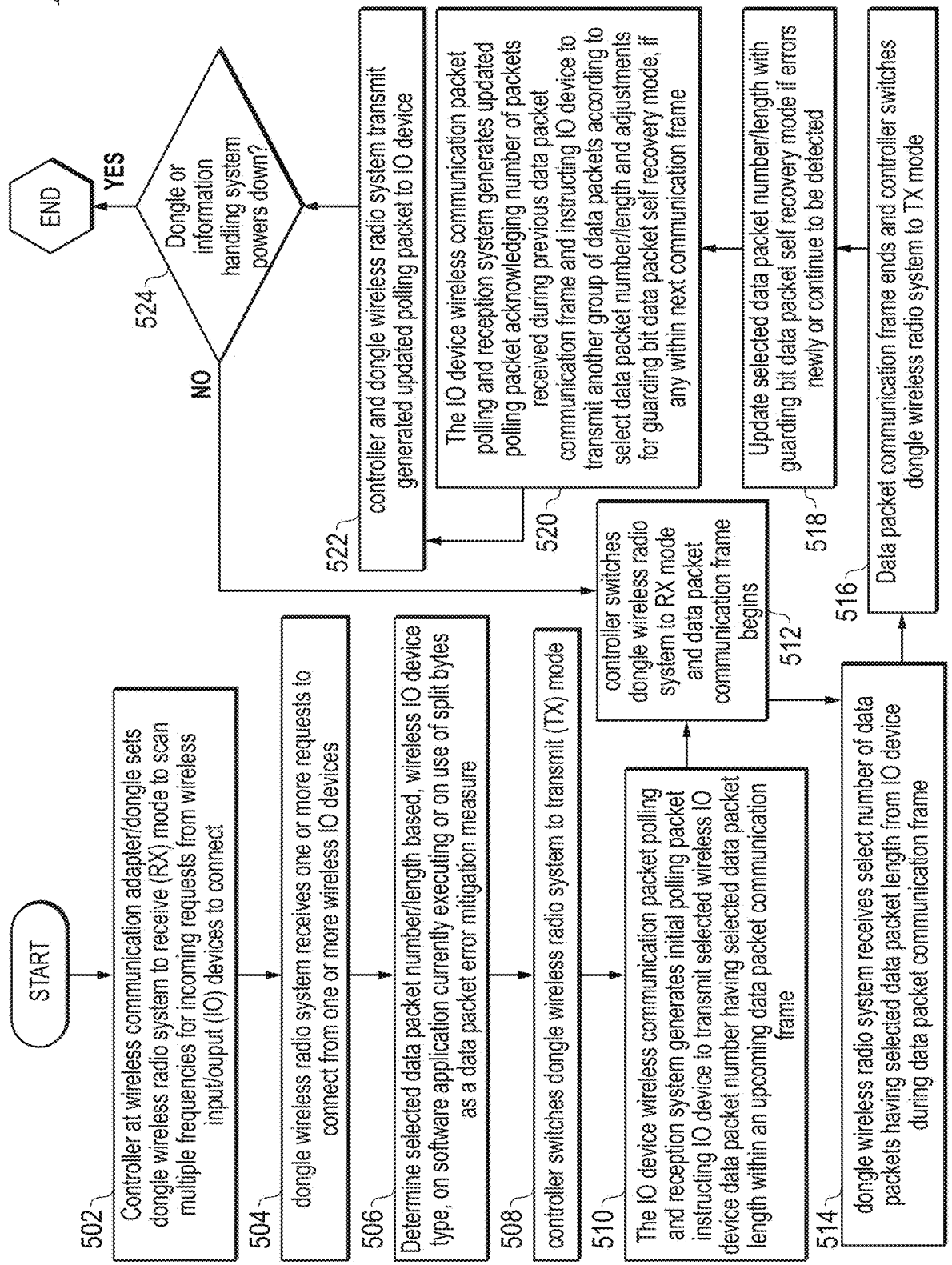
FIG. 5 is a flow diagram illustrating a method of determining wireless IO device selected data packet number and selected packet length for use with the IO device wireless communication packet polling and reception system having a guarding bit data packet self-recovery system for error mitigation according to an embodiment of the present disclosure.

FIG. 5 is a flow diagram illustrating a method of orchestrating transmission of data packets from one or more wireless IO devices to a wireless communication adapter/dongle during a data packet communication frame to decrease power consumption, risk of data packet collision, and latency according to an embodiment of the present disclosure. As described herein, many manufacturers of wireless IO devices (e.g., mouse, keyboard, headset, virtual reality peripheral devices) for pairing wirelessly with an information handling system build these devices to provide a basic or rudimentary communication capabilities, for example, those that may comply with the Bluetooth® Low Energy (BLE) communication standard. For example, many existing wireless IO devices are designed to communicate with a wireless communication adapter/dongle using a one reception/one transmission (1TX/1RX) format in which each time the wireless communication adapter/dongle polls a device then operates in receive mode to receive a data packet, it must then switch to transmit mode and transmit an ACK data packet back to the wireless IO device from which the initial data packet was received. The wireless communication adapter/dongle may then switch back to a receive mode to receive the next data packet from the wireless IO device. This process may be repeated each time a new data packet is generated at the wireless IO device, for example. Such a wireless IO device communication protocol or any wireless IO device communication protocol may be used with the data packet error mitigation for wireless IO device data packets including using a guarding bit data packet self-recovery system according to embodiments herein. For the embodiment with respect to FIG. 5, the data packet error mitigation for wireless IO device data packets including using a guarding bit data packet self-recovery system of the present embodiments is discussed in the context of a IO device wireless communication packet polling and reception system that orchestrates scheduled delivery of a plurality of data packets from each of one or more wireless IO devices in a data packet communication frame between delivery of ACK data packets as described herein.

Each of the transmission/reception mode switches consumes power, causes delay and reduced throughput, and increases potential for collision between incoming wireless IO device data packets and outgoing ACK data packets. This may further cause the customer to experience reduced performance between their input via the wireless IO device (e.g., movement of the mouse) and the corresponding feedback displayed by the information handling system (e.g., movement of the cursor. As a result, existing systems employing this 1TX/1RX approach may fail to meet customer needs for operational data throughput during execution of latency-sensitive software applications such as gaming applications or other high definition audio/visual applications. The IO device wireless communication packet polling and reception system in an embodiment may orchestrate scheduled reception of a plurality of data packets to improve wireless IO report rate, improve throughput capacity, or reduce latency depending on desired performance requirements. For example, such desired performance requirements include a selected number of data packets suitable for a detected, executing software application from each of a plurality of wireless IO devices between transmission of ACK data packets within a polling packet to each of those wireless IO devices to provide higher data throughputs and improved performance while also reducing energy waste. Additionally, selected data packet number or selected data packet length is adjustable in the responsive data packet communication frames under this wireless IO device communication protocol. Any wireless IO device communication protocol as described in embodiments herein, including that executed by the IO device wireless communication packet polling and reception system, may further include a guarding bit data packet self-recovery system to select among a plurality of data packet error mitigation measures including using split bytes with guarding bits and parity bits inserted with adjusted selected data packet number or adjusted data packet length to under certain detected conditions in some embodiments herein.

At block 502, a controller for a wireless communication adapter/dongle or a network interface device for an information handling system may set a wireless radio system to a receive (RX) mode in an embodiment. While in this RX mode in an embodiment, the wireless radio system may scan multiple frequencies for incoming pairing requests from one or more wireless IO devices. For example, in an embodiment described with respect to FIG. 3, a wireless radio system of the wireless communication adapter/dongle 330 or the information handling system 300 may scan a plurality of frequencies at which wireless IO devices (e.g., 380) may be expected to transmit requests to connect with the dongle 330 or the information handling system 300.

The wireless radio system in an embodiment at block 504 may receive one or more requests to connect from one or more wireless IO devices. For example, while in this RX mode, the wireless radio system of the wireless communication adapter/dongle 330 or the information handling system 300 may receive a request to connect 310 with the wireless communication adapter/dongle 330 or the information handling system 300. This connection request 310 in some embodiments may include an identification of the model number or various default communication metrics for the mouse 380 or other identifying information for the mouse 380 that the wireless communication adapter/dongle 330 or the information handling system 300 may use to access stored information identifying such default communications metrics. For example, the connection request 310 may include identification for the mouse or other IO devices 380 that is associated with a performance policy for the wireless IO device identifying one or more wireless IO device prioritized performance metrics identified by a user or a developer of a software application as affecting performance of that wireless IO device or a software application detected as currently executing at the information handling system. These one or more wireless IO device prioritized performance metrics are identified within such performance policies as having such wireless IO device prioritized performance metrics for use with a coupled and operatively connected wireless IO device when an identified software application is executing. In additional embodiments, the IO device wireless communication packet polling and reception system may also include code instructions for a guarding bit data packet self-recovery system to determine whether to apply a data packet error mitigation measure that requires split bytes with guarding bits and parity bits inserted according to a Hamming algorithm or other data packet error mitigation.

At block 506, the controller of the wireless communication adapter/dongle or the information handling system in an embodiment may determine an initial selected data packet number and an initial selected data packet length for an upcoming data packet communication frame between the wireless IO device and the wireless communication adapter/dongle or information handling system. Such a selected data packet number or selected data packet length may depend on the wireless IO device and its performance characteristics, performance requirements suitable to meet requirements for wireless IO device prioritized performance metrics for a detected software application executing on the information handling system, or it may depend on active use of split bytes with inserted guarding bits as a data packet error mitigation measure according to embodiments herein. For example, the controller of the wireless communication adapter/dongle 330 or the information handling system 300 in an embodiment may determine a type of wireless IO device and model type from a wireless mouse, wireless keyboard, or other and determine what selected packet number or selected data packet length may be established or optimal for that type or model of wireless IO device such as from a table of performance characteristics. Additionally, in some embodiments, an initial selected data packet number o and an initial selected data packet length for an upcoming data packet communication frame 340 between the wireless IO device 380 and the wireless communication adapter/dongle 330 or the information handling system 300 may be selected based on performance metrics of a detected operating software application for use with the wireless IO device 380 in another example embodiment. Further, when the guarding bit data packet self-recovery system determines conditions are met, as described further in FIG. 6, for the wireless IO device 380 and wireless communication dongle 330 to code and decode data bytes using split bytes with inserted guarding bits and parity bit according to embodiments herein. The selected number of data packets, selected data packet length, or both may be adjusted on the fly to accommodate execution of such a data packet error mitigation measure turned on or off in various embodiments.

The controller of the wireless communication adapter/dongle or the information handling system in an embodiment at block 508 may switch the wireless radio system to a transmit (TX) mode for transmission of an initial polling packet for synchronizing delivery of data packets between the wireless IO device and the wireless communication adapter/dongle or information handling system. For example, upon successful receipt of the connection requested at block 504 above, the wireless communication adapter/dongle 330 or the information handling system 300 may switch to a transmit (TX) mode.

At block 510, the controller of the wireless communication adapter/dongle or the information handling system executing code instructions of the IO device wireless communication packet polling and reception system in an embodiment may generate a polling packet. For example, the controller of the wireless communication adapter/dongle 330 or the information handling system 300 executing code instructions of the IO device wireless communication packet polling and reception system in an embodiment may generate a polling packet 320 that instructs each of the wireless IO devices (e.g., 380) paired with the wireless communication adapter/dongle 330 or the information handling system 300 to transmit a plurality of a selected number of data packets of a selected length and at selected time slots during a first data packet communication frame 340 between the wireless communication adapter/dongle 330 or the information handling system 300 and each of the paired wireless IO devices (e.g., 380) suitable to meet requirements for the wireless IO device, the prioritized performance metrics for a detected software application executing on the information handling system, or to accommodate the split bytes with guarding bits inserted data packet error mitigation measure that may be implemented by the guarding bit data packet self-recovery system.

The controller of the wireless communication adapter/dongle 330 or the information handling system 300 executing code instructions of the IO device wireless communication packet polling and reception system and the guarding bit data packet self-recovery system in an embodiment may determine the selected data packet number, selected data packet length, and assign data packet transmission time slots for receipt of data packets transmitted from the wireless IO device 380 based on identification of the wireless IO device type or model 380, a currently executing software application at the information handling system, a determination to implement the split byte with guarding bits inserted data packet error mitigation measure to increase the number of packets to error encode and transmit to the wireless IO device data to the wireless communication dongle 330.

For example, the controller of the wireless communication adapter/dongle 330 or the information handling system 300 executing code instructions of the IO device wireless communication packet polling and reception system may determine an initial selected wireless IO device application suited data packet number of N=four, initial selected data packet length of 16 bytes (B), and the data packet transmission time slots of N=4 time slots every 0.0023 seconds for receipt of data packets transmitted from the wireless IO device 380 within a data packet communication frame having a total length of 0.0138 seconds suitable to meet the requirements of the executing software application. This determination may be made in order to maximize a highest wireless IO device prioritized performance metric of wireless communication adapter/dongle report rate among the wireless IO device prioritized performance metrics. The implementation of the guarding bit data packet self-recovery system with split data bytes having inserted guarding bits encoded for transmission may increase the number of packets (N=8) in one embodiment to accommodate double the number of bytes. In another embodiment, the implementation of the guarding bit data packet self-recovery system with split data bytes having inserted guarding bits encoded for transmission may increase the length of the packets to 32 bytes to accommodate double the number of bytes during implementation of this data packet error mitigation measure.

The controller of the wireless communication adapter/dongle 330 or the information handling system 300 may instruct the wireless radio system to transmit the polling packet 320 containing the selected data packet number, the selected data packet length, at allotted data packet transmission time slots to the wireless IO device or devices (e.g., 380). This polling packet 320 in an embodiment may synchronize communication between the wireless communication adapter/dongle 330 or the information handling system 300 and the wireless IO device 380 for a data packet communication frame beginning at a selected time and having the selected duration (e.g., 0.0138 seconds) and number of packets N (e.g., N=4 or N=8) as coordinated at the software application performance-specific IO device wireless communication packet polling and reception agent at the wireless IO device 380.

The controller for the wireless communication adapter/dongle or the information handling system in an embodiment at block 512 may switch the wireless radio system to RX mode for receipt of a first data packet within a data packet communication frame. For example, in an embodiment described with respect to FIG. 3, upon transmission of the polling packet 320 in an embodiment, the controller for the wireless communication adapter/dongle 330 or the information handling system 300 may switch the wireless radio system into a receive mode to await the beginning of the data packet communication frame 340 with the wireless IO device 380. At the time specified within the initial polling packet 320 in an embodiment, the data packet communication frame 340 may begin with receipt of a first packet 350 responsive to the initial polling packet 320 from the wireless IO device 380. In an embodiment, the first packet 350 for the data packet communication frame 340 may adhere to the instructions received within the initial polling packet 320. For example, in an embodiment, the first packet 350 may have a selected data packet length, depending on the wireless IO device type or model, currently executing, or whether the guarding bit data packet self-recovery system implements split bytes with inserted guarding bits and parity bits. The selected number of data packets at the selected data packet length may be delivered at the synchronized time designating the beginning of the data packet communication frame 340 within the first of the allotted data packet transmission time slots, as defined within the initial polling packet 320 and coordinated by the IO device wireless communication packet polling and reception agent at the wireless IO device 380. In an example embodiment, the selected data packet length for a wireless IO device may be either 16 or 32 bytes depending on when the guarding bit data packet self-recovery system implements split bytes with inserted guarding bits and parity bits. Similarly, in another example embodiment, the selected data packet length for a wireless IO device may be either 16 or 32 bytes depending on when the guarding bit data packet self-recovery system implements split bytes with inserted guarding bits and parity bits.

At block 514, the wireless radio system of the wireless communication adapter/dongle or information handling system in an embodiment may receive a plurality of data packets from one or more wireless IO devices during a first data packet communication frame. For example, during the data packet communication frame 340 in an embodiment, the wireless radio system of the wireless communication adapter/dongle 330 or the information handling system 300 may receive a plurality of data packets equivalent to the selected data packet number N as defined within the initial polling packet 320. As described the selected data packet number and selected data packet length may be on the fly adjustable from polling packet to polling packet or even, in some embodiments during the transmission of the data packet communication frame. The selected data packet number, selected data packet length or both for a wireless IO device may be adjustable depending on when the guarding bit data packet self-recovery system implements split bytes with encoded guarding bits and parity bits according to embodiments of the present disclosure. Another factor determining the selected data packet number or data packet length of the data packet communication frame include the type or model of wireless IO device which may be identified within a header of the wireless IO device data transmitted in some embodiments. Yet another factor determining selected data packet number and data packet length for a wireless IO device may be a combination suitable to meet the wireless IO device prioritized performance metrics for an executing software application and which may be adjustable if, for example, the software application changes or a phase of execution of the software application changes.

In an embodiment, when split bytes are used with encoded guarding bits in the received data packet communication frame of received data packets, the wireless communication dongle will decode the split bytes with the Hamming algorithm to determine and fix bit errors according to embodiments herein. Then the wireless communication dongle may reconstitute the wireless IO device data byte from the received split bytes and deliver the same to the information handling system to which the dongle is operatively coupled.

A microcontroller executing code instructions of the IO device wireless communication packet polling and reception system at the wireless communication adapter/dongle 330 or the information handling system 300 may ensure that, during this data packet communication frame 340, the wireless radio system remains in a receive mode to receive data packets from the one or more paired wireless IO devices (e.g., 380). In other words, the controller of the wireless communication adapter/dongle 330 or the information handling system 300 may avoid any power loss or inadvertent data packet collision threat due to a reduction in rapid switching between RX/TX modes during this data packet communication frame 340.

The data packet communication frame orchestrated according to the initial polling packet may end in an embodiment at block 516, and the controller for the wireless communication adapter/dongle or information handling system may switch the dongle wireless radio system to the TX mode. For example, in an embodiment described with reference to FIG. 3, following the data packet communication frame 340 and time or number of packets allocated for the same, the controller of the wireless communication adapter/dongle 330 or the information handling system 300 may switch the wireless radio system to a TX mode for orchestrating a future data packet communication frame.

At block 518, the controller for the wireless communication adapter/dongle or information handling system in an embodiment may execute code instructions of the IO device wireless communication packet polling and reception system to update the selected data packet number or selected data packet length. In one example embodiment, if data packet errors have been detected and conditions of RSSI and data packet error rate fall within threshold levels, the guarding bit data packet self-recovery system turn on the use of split bytes with encoded guarding bits for the next data packet communication frame. The IO device wireless communication packet polling and reception system may adjust or update the selected data packet number or selected data packet length in the next updated polling packet to implement this data packet error mitigation measure. For example, to implement the split bytes with inserted guarding bits and parity bits as a data packet error mitigation measure for a wireless IO device meeting the conditions of embodiments herein, doubling the selected data packet number, doubling the data packet length, or some other adjustment to both may be made in an updated polling packet to accommodate the split bytes. In other embodiments, the selected data packet number and selected data packet length may remain the same in a next polling packet when the guarding bit data packet self-recovery system is continues to be implemented with split bytes and inserted guarding bits and parity bits as a part of an ongoing data packet error mitigation measure from previous polling packets due to ongoing detected conditions. In yet other embodiments, the guarding bit data packet self-recovery system may have detected a change in RSSI or data packet error rate such that it no longer implements the split bytes with inserted guarding bits and parity bits as a data packet error mitigation measure for a wireless IO device and may update the selected data packet number and selected data packet length to reduce one or both since split bytes are no longer used. For example, conditions may have improved and data packet errors not detected or conditions may have worsened such that other data packet error mitigation measure must be implemented instead to improve performance of the wireless IO device data communications.

Other updates to selected data packet number or selected data packet length instructed for a wireless IO device in an next, updated polling packet may include a changing or keeping selected data packet number and selected data packet length due to any changes or continued operation of detected software applications currently executing at the information handling system in another example embodiment at block 518. If the software application changes (e.g., a first software application ceases execution and a second software application begins execution), or the current executing software application changes operating priorities, the updated polling packet may change the selected number of data packets or the selected data packet length to meet new wireless IO device prioritized performance metrics. Moreover, in some embodiments, the phase of execution of the identified executing software application may change and when the phase of execution changes, the IO device wireless communication packet polling and reception system may update the wireless IO device application suited data packet number or wireless IO device application suited data packet length based on the detected phase of execution of an identified software application in other embodiments. Similarly, changes may be detected in desired or selected performance requirements for a wireless IO device may determine if any changes are made to selected data packet number or selected data packet length in an update polling packet in some other embodiments.

If the guarding bit data packet self-recovery system is still implementing split bytes with inserted guarding bits and parity bits as a data packet error mitigation measure, then no change to the selected data packet number and selected data packet length may be made in the updated polling packet. Similarly, if the same software application is executing at the information handling system with the same operating priorities, the selected number of data packets and the selected length of data packets may remain the same in the updated polling packet. Otherwise, if a change in either of the above is required by execution of the IO device wireless communication packet polling and reception system and execution of the guarding bit data packet self-recovery system, the updated polling packet may adjust either or both of the selected data packet number or selected data packet length for at least one wireless IO device. The updated polling packet will also include an acknowledgement (ACK) of previous data packet communication frame data packets from one or more wireless IO devices communicating in the data packet communication frame.

The controller for the wireless communication adapter/dongle or information handling system in an embodiment at block 520 may generate an updated polling packet acknowledging the number of packets received during the previous data packet communication frame to each paired wireless IO device (e.g., N packets from the wireless IO device). The updated polling packet in an embodiment may further include instructions for the one or more paired wireless IO devices to transmit another designated selected number (e.g., N, N+1, N+N, etc.) of data packets at identified time slots with updated times within a second data packet communication frame to meet requirements of implementing or cancelling the split bytes with inserted guarding bits and parity bits as a data packet error mitigation measure for a wireless IO device in some embodiment. In another embodiment, the designated selected number to meet the wireless IO device prioritized performance metrics for a current or newly detected executing software application and its operating performance priorities from the operatively coupled wireless IO device in some embodiments. The updated polling packet in yet another embodiment may further include instructions for the one or more paired wireless IO devices to transmit another designated selected data packet length in a selected number of data packets with updated times within a second data packet communication frame to meet requirements of implementing or cancelling the split bytes with inserted guarding bits and parity bits as a data packet error mitigation measure for a wireless IO device in an embodiment. Data packet length may be selected to meet the wireless IO device prioritized performance metrics for a current or newly detected executing software application and its operating performance priorities from the operatively coupled wireless IO device in some other embodiments. Additionally, some combination of changes to either the selected data packet number or selected data packet length may be instructed in the updated polling packet by the IO device wireless communication packet polling and reception system in other embodiments to accommodate the split byte and guarding bits data packet error mitigation measure or to accommodate required changes in wireless IO device communication performance.

For example, at block 520 the controller in an embodiment may execute code instructions of the IO device wireless communication packet polling and reception system to generate an updated polling packet 370. In an embodiment, such an updated polling packet 370 may include an acknowledgement header (ACK) identifying the number (N) of packets received during the previous data packet communication frame 340. For example, in an embodiment in which the Nth packet 360 is the fourth of four packets allotted to the wireless IO device 380 for transmission within the data packet communication frame 340 within the initial polling packet 320, such an updated polling packet 370 may acknowledge receipt of four packets.

The updated polling packet 370 in an embodiment may further include updated instructions for synchronizing transmission of data packets within a second, later data packet communication frame. For example, the updated polling packet 370 may provide an updated time for initiation of such a second, later data packet communication frame for N packets again or may change to a new selected number of data packets or a new selected data packet length in according with embodiments herein.

Transmission of an initial polling packet 320 prior to a scheduled data packet communication frame 340 and transmission of an updated polling packet 370 following the scheduled data packet communication frame 340 for acknowledgement of received packets and orchestrating an upcoming second data packet communication frame may minimize the number of acknowledgement packets and polling packets transmitted from the wireless communication adapter/dongle 330 or information handling system 300 and minimize the frequency with which switches between TX mode and RX mode are required. In such a way, the IO device wireless communication packet polling and reception system may decrease the frequency of ACK data packets transmitted and occupying airtime, and the frequency of mode-switching described above with respect to existing systems. Additionally, self-recovery of bytes in packets when the guarding bit data packet self-recovery system implements split bytes with inserted guarding bits under the right conditions may reduce data packet retransmission requests to further reduce energy consumption and occupied radio airtime relative to existing systems. These aspects may further decrease power consumed by rapid mode-switching, decrease latency, and improve overall data throughput and user experience.

At block 522, the controller for the wireless communication adapter/dongle or information handling system in an embodiment may instruct the wireless radio system to transmit the updated polling packet generated at block 520 to one or more paired wireless IO devices. For example, in an embodiment described with respect to FIG. 3, the controller for the wireless communication adapter/dongle 330 or the information handling system 300 in an embodiment may execute code instructions of the IO device wireless communication packet polling and reception system to instruct the wireless communication dongle 330 or wireless radio system of information handling system 300 to transmit an updated polling packet 370 to one or more wireless IO devices 380.

The controller of the wireless communication adapter/dongle or the information handling system in an embodiment at block 524 may determine whether the dongle or the information handling system has powered down. If the wireless communication adapter/dongle 330 or the information handling system 300 has powered down in an embodiment, there may be no need or no capability to switch the dongle wireless radio system to a RX mode for further communication with the IO device, and the method may then end. In another embodiment, the IO device wireless communication packet polling and reception system may assess whether any linked wireless IO device 380 is still responsive (e.g., not powered down or in sleep mode) and capable of engaging in further data packet communication frames with the wireless communication adapter/dongle. If a wireless IO device 380 has powered down or entered sleep mode, it will need to rejoin via a request to connect as at block 502 in an embodiment and thus the method may end for that wireless IO device that enters sleep mode or powers down.

If the wireless communication adapter/dongle or the information handling system has not powered down in an embodiment, the method may proceed to block 512 to switch to receive (RX) mode and await a data packet communication frame responsive to the updated polling packet 370 provided at block 522. Then the steps of the method of FIG. 5 may continue with updating polling packet for adjustments to selected data packet number and selected data packet lengths for continued wireless IO device data communications until shut down. If the wireless communication adapter/dongle or the information handling system has powered down in an embodiment, the method may end.

Figure 6:
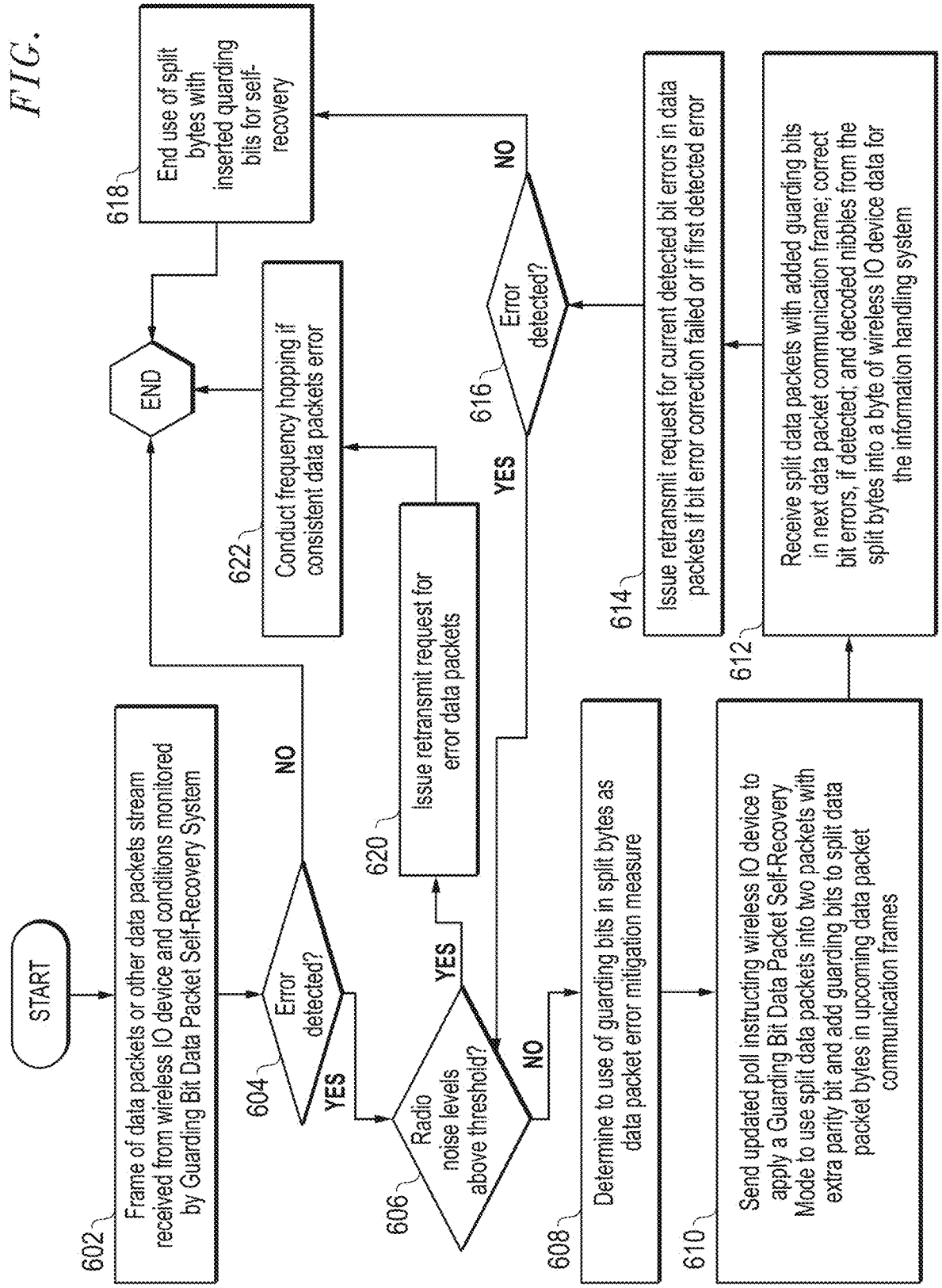
FIG. 6 is a flow diagram illustrating a method of determining among data packet error mitigation for wireless IO device data packets including using a guarding bit data packet self-recovery system to reduce retransmit requests and frequency hopping for error mitigation according to an embodiment of the present disclosure.

FIG. 6 is a flow diagram illustrating a method of executing code instructions for a guarding bit data packet self-recovery system by a wireless communication dongle in conjunction with a wireless IO device to implement one or more data packet error mitigation measures according to an embodiment of the present disclosure. The wireless communication dongle may execute code instructions of guarding bit data packet self-recovery system. One or more wireless IO devices paired with the wireless communication dongle may execute code instructions of a guarding bit data packet self-recovery system agent to coordinate any implementation of a data packet mitigation measure when split bytes with inserted guarding bits and parity bits are implemented according to an embodiment.

The guarding bit data packet self-recovery system as part of the IO device wireless communication packet polling and reception system is executed to determine or adjust instructions for selected data packet number and selected data packet length for a wireless IO device based on identification several factors according to embodiments. For example, the guarding bit data packet self-recovery system determines whether the use of split bytes with guarding bits inserted is a required data packet error mitigation measure to be implemented based on detected conditions of wireless IO device data communications for a wireless IO device in an embodiment.

The data packet error mitigation for wireless IO device data packets including using a guarding bit data packet self-recovery system may be used with any wireless IO device communication protocol according to embodiments herein. For the discussion of FIG. 6, the data packet error mitigation for wireless IO device data packets including using a guarding bit data packet self-recovery system of the present embodiments is discussed in the context of a IO device wireless communication packet polling and reception system in some embodiments and this system orchestrates scheduled delivery of a plurality of data packets from each of one or more wireless IO devices in a data packet communication frame between delivery of ACK data packets as described herein. The IO device wireless communication packet polling and reception system orchestrates receipt of data packets within a data packet communication frame according to embodiments of the present disclosure. A selected data packet number and selected data packet length in an embodiment may be selected based on whether split bytes with guarding bits and parity bit is used and based on other wireless IO device prioritized performance metrics (e.g., low inter-frame latency, high wireless IO device data packet transmission rate, or high dongle report rate) required for the wireless IO device according to embodiments of the present disclosure.

At block 602, a controller for the wireless communication adapter/dongle or wireless radio system for an information handling system executes code instructions of the IO device wireless communication packet polling and reception system and the guarding bit data packet self-recovery system in an embodiment may identify, from received data packets in the data packet communication frame, that wireless IO device data has errors during transmission. As described in embodiments herein, the IO device wireless communication packet polling and reception system establishes a polling packet with instructions to each of one or more wireless IO devices on its selected data packet number and selected data packet length for data transmissions in a data packet communication frame back to a wireless communication dongle or wireless adapter. This selected data packet number and selected data packet length may be specified for each operatively coupled wireless IO device and may be adaptable or adjustable for any number of wireless IO devices on the fly with the IO device wireless communication packet polling and reception system. In other embodiments, the wireless dongle or information handling system receiving a stream of data packets pursuant to any wireless IO device communication protocol may determine that data packets received from the wireless IO device contains errors during transmission and those errors may be monitored over the received data packet stream.

During transmission of data packets from any wireless IO device in the data packet communication frame or other data packet stream, data packet errors may occur including accidental changes to one or more data bits or corrupted data, lost data bytes or packets, or other issues. Such issues may be due to radio noise levels on a wireless radio frequency communication band or on a particular channel, weak signal from a wireless IO device, data collision or delay due to radio frequency band or channel congestion, or other errors. For this reason, the controller for the wireless communication adapter/dongle or wireless radio system for an information handling system executes computer readable code instructions for the guarding bit data packet self-recovery system to monitor operations and data packet communications conducted by the IO device wireless communication packet polling and reception system.

Proceeding to block 604, the controller for the wireless communication adapter/dongle or wireless radio system executes the guarding bit data packet self-recovery system to detect or determine whether any data errors are occurring in the received data packets and which wireless IO device has transmitted those data packets. In one embodiment, errors are detected as present when a first data packet error rate or data byte error rate is detected as above a first, lower data packet error rate threshold. This first, lower threshold data error rate is lower relative to a second higher data error rate level discussed below in one embodiment indicating data error levels may be too high for use of split bytes with guarding bits inserted for self-recovery as discussed below.

One or two isolated data errors may be managed by a retransmission request or by skipping a corrupt data byte in some embodiments, but this may not be tenable when data error occurrences reach a somewhat more regular level, for example the first, lower data error rate threshold over a monitoring period of data packets or frames. In the latter detected radiofrequency communication conditions, data packet error mitigation measures may be required as described in embodiments of the present disclosure. When plural wireless IO devices are operatively coupled to the wireless communication adapter/dongle or wireless radio system, the data packets in the responsive data packet communication frame may include identification in header data or otherwise identifying which wireless IO device transmitted the data packet having error in one embodiment. Alternatively, the allotted timeslots on which the data packets are delivered may be used to determine which of plural wireless IO devices transmitted a data packet in the data packet communication frame in other embodiments.

The guarding bit data packet self-recovery system detects or determines data errors that may include corrupted data bytes as accidental transmission errors, lost data packets, or the like. For example, transmitted data errors including accidental data errors in received bytes of data in the data packets from transmission may be detected by a cyclical redundancy check (CRC) or other simple parity type check on the received data packets. Further, the IO device wireless communication packet polling and reception system may also detect errors such as missing packets that do not arrive at expected, allotted timeslots in a data packet communication frame.

If no error is detected or the data error rate has not reached a first, lower threshold at block 604, then the method may end and the IO device wireless communication packet polling and reception system may continue operating with polling packets and responsive data packet communication frames as before with the guarding bit data packet self-recovery system monitoring for errors but not implementing split bytes with guarding bits or other data packet error mitigation measures other than data packet retransmissions as needed.

If a data error is detected or the data error rate has not reached a first, lower threshold at block 604, the method may proceed to block 606 where the controller for the wireless communication adapter/dongle or wireless radio system executing the guarding bit data packet self-recovery system detects radio noise levels or radiofrequency signal levels from data packet communications. The radio noise or signal to noise ratio is used to determine if a level of radio frequency noise or the level of radio noise relative to a data packet communication channel signal exceeds a particular threshold. In one embodiment, the controller for the wireless communication adapter/dongle or wireless radio system may utilize the radio and antenna system to determine radio frequency noise levels based on RSSI that are non-signal radio frequency levels detected by the antenna and radio. In one embodiment, an RSSI threshold level may be noise levels above −80 dBm although any threshold may be used. For example, noise level thresholds may fall between −90 dBm to as high as −60 dBM to trigger a noise level indicating that radio frequency noise is too high to use split bytes with inserted guarding bits as a data packet error mitigation measure. In other embodiments, a signal to noise ratio (SNR) may be determined for the data packet wireless communication signal relative to detected background noise and if a threshold SNR level indicates below-threshold levels, high radio noise or weak signal may cause repeated errors and the split bytes with guarding bits may not be as effected as a data packet error mitigation measure. In yet another embodiment, the IO device wireless communication packet polling and reception system may record a number of packet retransmissions or lost packets over a monitoring period to determine if a second, higher data error rate threshold of data packet errors is occurring in some embodiments. If the data packet errors are occurring above the second, higher data packet error rate threshold, this may indicate a greater level of radio signaling problem or radio noise problem than is effectively and efficiently managed by using split bytes with guarding bits inserted for self-recovery as a data packet error mitigation measure.

The split bytes with guarding bits inserted for self-recovery as a data packet error mitigation measure is effective when data packets are received and data bytes have only 1 bit errors or up to 2 bit errors depending on location of both bit errors across split bytes. Otherwise, a greater bit error rate in data bytes or lost packets due to very poor radio noise conditions, poor data packet signal conditions, or other chronic problems with a signal for a particular wireless IO device or plural wireless IO devices will nonetheless require repeated data retransmission requests when the RSSI level or data packet error rate is above a threshold level, or SNR level is below a threshold at block 606. Thus, when the radio noise level is above a threshold level or the data packet signal is below a particular level relative to the radio noise, higher levels of bit errors or lost data packets are likely. Similarly, this may be detected by the data packet error rate levels exceeding a second, higher threshold level for one or more wireless IO devices to indicate a higher likelihood of bit error levels above 1 or 2 data bit errors per data byte or indicating lost packets are occurring frequently. When noise RSSI or data error rates are above a threshold or SNR is below a threshold, the flow may proceed to block 620 to utilize other data packet error mitigation measures. When the threshold levels for RSSI noise or data packet error rates are not reached or SNR is above the SNR threshold, data packet errors may be more manageable using split bytes with inserted guarding bits for self-recovery and flow may proceed to block 608.

At block 620, the controller for the wireless communication adapter/dongle or wireless radio system for an information handling system executing code instructions of the guarding bit data packet self-recovery system may have determined that radio noise levels or data packet error rates are above threshold levels or SNR levels are below a threshold, such that data packet error mitigation measures other than implementing split bytes with guarding bits for data packet self-recovery is warranted. At block 620, the IO device wireless communication packet polling and reception system in an embodiment may simply issue retransmit requests for errant data packets from an operatively coupled wireless IO device. Retransmission may occur by the wireless communication dongle in any event when a data packet error occurs such as a corrupt data byte or missing data packet including when and self-recovery fails to recover an accurate data byte such as with more than 2 or 3 bit errors, depending on location, in a data byte. In some embodiments, when data packet error rate or noise levels exceed a threshold indicating a chronic radio frequency issue or a larger radiofrequency communication issue causing more substantial data errors between the wireless communication adapter/dongle or wireless radio system and one or more wireless IO devices, the guarding bit data packet self-recovery system may instruct the IO device wireless communication packet polling and reception system to continue with brute force data retransmission requests from the wireless IO devices to simply enable wireless IO device data communications in some embodiments. This may, however, degrade performance of the wireless IO devices due to latency or congestion. Other mitigation measures such as dropping corrupt data bytes or other measures may also be implemented, but may have a negative impact on user experience with the wireless IO device.

Proceeding to block 622, the controller for the wireless communication adapter/dongle or wireless radio system executes the guarding bit data packet self-recovery system to require another data packet error mitigation measure. Upon detecting conditions of RSSI noise levels above a threshold level of noise, SNR levels below a threshold indicating high noise levels or low data signal levels, or data packet error rates above a threshold level as described above, the guarding bit data packet self-recovery system may require the radio system of the wireless communication adapter/dongle or wireless radio system to utilize frequency hopping in an embodiment. The radio system may be instructed to use frequency hopping as well with radio noise levels are high to find another channel in the radio frequency communication band (e.g., 2.4 GHz band) that may have lower levels of radio noise. Such a frequency hopping data packet error mitigation measure is costly in power consumption and time to scan channels for a clear channel and, in some embodiments, for lower noise levels, but may be more effective at mitigating a radio environment with chronic high noise levels experienced on a data communication radiofrequency channel in some embodiments. With one or both of data packet error mitigation measures of repeated retransmission requests at block 620 and frequency hopping at block 622, then the method may end. Nonetheless, the guarding bit data packet self-recovery system may execute with the IO device wireless communication packet polling and reception system to monitor data packet errors and error levels in data packet communication frames according to embodiments herein.

Returning to block 606, when the threshold levels are not exceeded for noise or data packet error rates, or the SNR threshold level is above a set threshold, flow may proceed to block 608. At block 608, if the controller for the wireless communication adapter/dongle or wireless radio system for an information handling system executing code instructions of the guarding bit data packet self-recovery system determines that radio noise is below a threshold level, SNR levels are high enough, or data packet error rate is below a threshold level, then the likelihood of manageable data byte corruption errors with self-recovery is indicated. For example, most frequent data byte corruption errors are 1 bits or less especially when wireless radio conditions are not extremely poor. Higher rate levels of bit error may occur when wireless radio conditions are poor, such as detected at block 606, due to high radio noise levels or weak data signaling and the split bytes with encoded guarding bits may be increasingly ineffective and still require retransmission request.

At block 610, the controller of the wireless communication adapter/dongle or wireless radio system for an information handling system executing code instructions of the guarding bit data packet self-recovery system may implement the split byte with guarding bits self-recovery data packet error mitigation measure according to embodiments herein. The guarding bit data packet self-recovery system works with the executing IO device wireless communication packet polling and reception system or other wireless IO device communication protocol system to include instructions in a next polling packet to use of split bytes and inserted guarding bits and parity bit in an embodiment. This may include altering the polling packet instructions for selected data packet number, selected data packet length, or some combination to adjust for any affected wireless IO device to accommodate double the data bytes used with the split byte and guarding data bits self-recovery measures in various embodiments. With reference to the example embodiment of FIG. 4, a wireless IO device subject to this data packet error mitigation measure may be instructed for each data byte 410 to split the wireless IO device data bits D1-D8 into two data nibbles of four bits D1-D4 and D5-D8 for use in split data bytes 425 and 420 respectively.

The wireless IO device 480 may be instructed to use split bytes 420, 425 with guarding bits 422, 423, 425 the first split byte 420 and guarding bits 427, 428, 429 in the second split byte 425. Additionally, a parity byte 421 and 426 may be added in each split byte 420, 425. Accordingly, execution of the IO device wireless communication packet polling and reception system with the guarding bit data packet self-recovery system will dynamically adjust a data packet number or data packet length of a data packet communication frame responsive to a polling packet from the wireless IO device 480 to the wireless communication adapter/dongle 430 at an information handling system 400 in one example embodiment. The selected data packet number, selected data packet length, or some combination may be adjusted on the fly by the guarding bit data packet self-recovery system and IO device wireless communication packet polling and reception system to accommodate the double number of bytes when the split bytes 420 and 425 are used to replace a single data byte 410 according to some embodiments herein. Other embodiments may use more packets or adjust data packet lengths in a transmitted data packet stream according to other wireless IO device communication protocols. In one embodiment, the IO device wireless communication packet polling and reception system may expand the selected data packet length instructed for the data packet communication frames to accommodate twice the number of data bytes for the split bytes 420, 425 with inserted guarding bits 422, 423, 424, 427, 428, 429 and parity bits 421, 426. In another example embodiment, the IO device wireless communication packet polling and reception system may expand the selected number of data packets instructed for the data packet communication frames to accommodate twice the number of data bytes for the split bytes 420, 425 with inserted guarding bits 422, 423, 424, 427, 428, 429 and parity bits 421, 426. The wireless IO device controller or other processing hardware may execute code instructions of the guarding bit data packet self-recovery system agent as described above such that the bit locations of the inserted guarding bits 422, 423, 424, 427, 428, 429 and their value of 0 or 1 in the split bytes 420 and 426 are selected or encoded according to the Hamming algorithm. With this encoding using the Hamming algorithm as described in embodiments above, accurate identification of a bit error and its location in each nibble D1-D4 and D5-D8 is possible based on indexed XOR functions of subset of bit locations upon receipt of data packets at the wireless communication adapter/dongle. The parity bits 421 and 426 are also added to ensure bit errors are accurately detected and not in the guarding bits or Hamming bits 422, 423, 424, 427, 428, 429 themselves according to embodiments herein. Identification of single bit errors in each split byte is therefore correctable by flipping the bit location that is the detected bit error in the split byte to provide a self-recovery system for a wireless IO device data packet.

At block 612, the controller of the wireless communication adapter/dongle or wireless radio system for an information handling system executing code instructions of the guarding bit data packet self-recovery system receives data packets with split bytes having the guarding bits encoded for self-recovery via application of a Hamming algorithm to execute a plurality of index XOR functions for subsets of wireless IO data bits and a guarding bit to determine if zero parity still occurs for that sub portion of the split byte indicating no bit error in those data bits and guarding bit in an embodiment. Referring again to the embodiment of FIG. 4 above, this data packet error mitigation measure operates to determine from the split bytes with guarding bits encoded at specified bit locations using an XOR operator with the encoded guarding bits and the data bits are indexed such that XOR of all bit positions containing a 1 should result in a 0 value if there is no error in particular Hamming coded portions of the split bytes 420, 425. If the indexed XOR of the bit positions is not 0, then it is determined an error of a corrupted bit exists among the indexed bits in that subset of bits in the split byte. The parity bits P 426 and P' 421 are used for all bits in each split byte 425 and 420 respectively to confirm whether an indication of an error is correct or not in an embodiment.

Upon determining that a corrupt data bit in a split byte, or two corrupt data bits with one in each split byte 420, 425, has occurred, the location of any corrupt data bits via application of the Hamming algorithm as described in embodiments herein may be determined. Further, in an embodiment, the guarding bit data packet self-recovery system may flip the corrupt bits to correct the byte to bypass any need to send a retransmission request. However, more corrupted data bits than one in each split byte 420 or 425 or other data packet errors such as lost packets or lost bytes may not be recoverable with the above at data packet retransmission may be required. Thus, embodiments of the guarding bit data packet self-recovery system detecting severe radio noise conditions or ongoing high frequency of lost packets or other data packet errors, such as due to collision or interference, may select among other data packet error mitigation measures as described in embodiments herein.

Upon recovery of any bit errors in either split byte, or even when no bit errors are recovered in either or both split bytes, the controller may execute code instructions of the guarding bit data packet self-recovery system to decode the split bytes to obtain the two nibbles of wireless IO device data for the information handling system. The controller may decode each split byte, including any corrected bit split bytes, using the Hamming algorithm to recover the nibble of the data bits from each split byte. Each nibble of wireless IO device data may be reconstituted as a wireless IO device data byte and the wireless communication dongle may provide this wireless IO device data byte to the information handling system and any wireless IO device controller executing thereon for input into executing software applications. For example, the reconstituted wireless IO device data byte may include position data of a wireless mouse for movement of a cursor on a display device or input into an executing software application. In another example, the reconstituted wireless IO device data byte may include keystroke data of a wireless keyboard for display of a character on a display device and input into an executing software application.

At block 614, upon the detection of the first data packet error in a data packet communication frame such that the next polling packet instructs the wireless IO device to use split bytes and guarding bits for self-recovery data packet mitigation error in a next data packet communication frame, the currently detected or first error may still be corrected using a retransmit request to the wireless IO device. Further, if bit error recovery does not work using the split bytes and guarding bits for self-recovery data packet mitigation error at block 612, the uncorrected error will need to be corrected via retransmit request to the wireless IO device at block 614.

Receiving split bytes pursuant to block 612 above may occur on a next round of received data packet communication frame with implemented split bytes with guarding bits inserted in some embodiments. For the first round with a data error detected however, the controller of the wireless communication adapter/dongle or wireless radio system for an information handling system executing code instructions of IO device wireless communication packet polling and reception system will issue a retransmit request for that detected data packet error in one embodiment. In such an embodiment, the split bytes with guarding bits may not have been implemented yet in an updated polling packet and the flow may proceed to utilize the split data packets with guarding bits for self-recovery in a next cycle of polling packet and responsive data packet communication frames from the wireless IO devices. In some other embodiments, the wireless communication dongle may issue a missed byte or data packet without a retransmission instead.

In other embodiments, the self-recovery measures using the split byte with guarding bits encoded for data packets received in a data packet communication frame may not be effective to recover an errant data packet, such as when more than one bit error occurs in a split byte. Then the controller of the wireless communication adapter/dongle or wireless radio system for an information handling system executing code instructions of IO device wireless communication packet polling and reception system will still be required to issue a retransmit request for that detected data packet error in another embodiment. In some other embodiments, the wireless communication dongle may issue a missed byte or data packet without a retransmission instead. Flow then proceeds to block 616 to continue determine if a data errors are still occurring or a data packet error rate level is still present above a first, lower data packet error rate threshold.

At block 616, if the errors are still present or the data packet error rate is above a first, lower data packet error rate threshold, flow may proceed to block 606 to assess radio noise levels and then to block 608 if the system is to continue to use split bytes and data packet guarding bits for self-recovery as a data packet error mitigation measure according to the embodiments herein. At block 616, if the errors are no longer present or the data packet error rate is below a first, lower data packet error rate threshold, flow may proceed to block 618 where the use of split bytes and data packet guarding bits for self-recovery is ceased and the selected data packet number or selected data packet length is returned to a previous value for the wireless IO device by the controller of the wireless communication adapter/dongle or wireless radio system for an information handling system executing code instructions of the IO device wireless communication packet polling and reception system. At this point the method may end although the guarding bit data packet self-recovery system execute on the controller of the wireless communication adapter/dongle or wireless radio system for an information handling system with IO device wireless communication packet polling and reception system to continue to monitor for data error rates and RSSI levels of data packets in the data packet communication frames from wireless IO devices.

The blocks of the flow diagrams of FIGS. 5 and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A guarding bit data packet self-recovery system executing at a wireless dongle or adapter of an information handling system comprising:
   a controller to transmit a polling packet, via the wireless dongle or adapter, with instructions for a specified number of data packets and a specified data packet length and an acknowledgement of received data packets to an operatively coupled wireless input/output (IO) device including instructions to return a packet frame of the specified number of data packets at the specified data packet length via a wireless link;
   the controller executing machine readable code instructions from a non-transitory computer readable medium of the guarding bit data packet self-recovery system to determine when received data packets in one or more packet frames includes wireless IO device data errors above a first threshold level and to determine that a radiofrequency noise level at the wireless dongle or adapter is below a radiofrequency noise threshold level;
   the controller to generate instructions for the wireless IO device in the polling packet for the wireless IO device to transmit split bytes for each wireless IO device data byte including guarding bits coded into each split byte via execution of machine readable code instructions of a Hamming algorithm;
   the controller to receive, via a wireless radio and antenna, the packet frame having the specified number of data packets including the split bytes and guarding bits and executing an exclusive-or operator on the coded guarding bits and subsets of data bits in the spit byte under the Hamming algorithm to detect a bit error and determine the bit error location in the split byte; and the controller flips the bit error at the bit error location to self-recover the split byte and mitigate a data packet error in the received, specified number of data packets for the packet frame.

2. The guarding bit data packet self-recovery system executing at a wireless dongle or adapter of claim 1 further comprising:

the controller to detect, via executing the Hamming algorithm on a second split byte, a second bit error and to determine a second bit error location in the second split byte.

3. The guarding bit data packet self-recovery system executing at a wireless dongle or adapter of claim 1 further comprising:

the controller to transmit a second, updated polling packet with instructions to return a second packet frame with adjustment to the specified data packet length to include double the number of bytes to accommodate split bytes with guarding bits included.

4. The guarding bit data packet self-recovery system executing at a wireless dongle or adapter of claim 1 further comprising:

the controller to transmit a second, updated polling packet with instructions to return a second packet frame with adjustment to the specified number of data packets from the wireless IO device to include double the number of data packets to accommodate split bytes with guarding bits included.

5. The guarding bit data packet self-recovery system executing at a wireless dongle or adapter of claim 1, wherein the wireless IO device is a wireless mouse.

6. The guarding bit data packet self-recovery system executing at a wireless dongle or adapter of claim 1 further comprising:

the controller to execute machine readable code instructions of the guarding bit data packet self-recovery system to determine that the radiofrequency noise level at the wireless dongle or adapter is above the radiofrequency noise threshold level;

the controller to instruct a radio of the wireless dongle or adapter to conduct a frequency hopping data packet mitigation measure.

7. The guarding bit data packet self-recovery system executing at a wireless dongle or adapter of claim 1 further comprising:

the controller to decode a nibble of the data bits from each split byte to provide a byte of data bits from the wireless IO device to the information handling system.

8. A method of executing data packet error mitigation during orchestration of transmission of data packets in a data packet frame between a wireless communication dongle of an information handling system and a wireless input/output (IO) device comprising:

transmitting, via the wireless communication dongle, a polling packet including a specified number of data packets and a specified data packet length and an acknowledgement of received data packets to an operatively coupled wireless IO device including instructions to return a packet frame with the specified number of data packets at the specified data packet lengths via a wireless link;

executing machine readable code instructions from a non-transitory computer readable medium of the guarding bit data packet self-recovery system, via a controller, to determine when received data packets in one or more packet frames includes data packet errors above a first data packet error threshold level and to determine that a radiofrequency noise level at the wireless communication dongle is below a radiofrequency noise threshold level;

generating instructions for the wireless IO device in the polling packet for the wireless IO device to transmit split bytes for each wireless IO device data byte including guarding bits coded into each split byte via a Hamming algorithm;

receiving, via a wireless radio and antenna, the packet frame having the specified number of data packets including the split bytes and guarding bits;

executing, via the controller, machine readable code instructions of the Hamming algorithm on the coded guarding bits and subsets of data bits in the spit byte under to detect a bit error and determine a bit error location in the split byte; and flipping the bit error at the bit error location to self-recover the split byte and mitigate a data packet error in the received, specified number of data packets for the packet frame.

9. The method of claim 8, further comprising:
detecting, via the controller executing the Hamming algorithm on a second split byte, a second bit error and determine a second bit error location in the second split byte.

10. The method of claim 8, further comprising:
decoding, via the controller, a nibble of the data bits from each split byte to provide a byte of data bits from the wireless IO device to the information handling system.

11. The method of claim 8, further comprising:
transmitting a second, updated polling packet via the wireless communication dongle, with instructions to return a second packet frame with adjustment to the specified data packet length to include double the number of bytes to accommodate split bytes with guarding bits included.

12. The method of claim 8, further comprising:
transmitting a second, updated polling packet via the wireless communication dongle, with instructions to return a second packet frame with adjustment to the specified number of data packets for the wireless IO device to include double the number of bytes to accommodate split bytes with guarding bits included.

13. The method of claim 8, further comprising:
executing machine readable code instructions of the guarding bit data packet self-recovery system to determine that the radiofrequency noise level at the wireless dongle or adapter is above the radiofrequency noise threshold level; and
instructing the wireless dongle or adapter to conduct a frequency hopping data packet mitigation measure.

14. The method of claim 8, further comprising:
executing machine readable code instructions of the guarding bit data packet self-recovery system to determine that a data packet error rate level is above a second, higher data packet error threshold level; and
instructing the wireless dongle or adapter to conduct a frequency hopping data packet mitigation measure.

15. A guarding bit data packet self-recovery system executing at a wireless dongle or adapter of an information handling system comprising:

a controller to transmit a polling packet, via the wireless dongle or adapter, with instructions for a specified number of data packets and a specified data packet length and an acknowledgement of received data packets to an operatively coupled wireless input/output (IO) device including instructions to return a packet frame of the specified number of data packets at the specified data packet length via a wireless link;

the controller executing machine readable code instructions from a non-transitory computer readable medium of the guarding bit data packet self-recovery system to determine when received data packets include data packet errors above a first data packet error threshold level and to determine that a radiofrequency noise level at the wireless dongle or adapter is below a radiofrequency noise threshold level;

the controller to generate instructions for the wireless IO device in the polling packet for the wireless IO device to transmit split bytes for each wireless IO device data byte including guarding bits coded into each split byte via execution of machine readable code instructions of a Hamming algorithm;

the controller to receive, via a wireless radio and antenna, the packet frame having the specified number of data packets including the split bytes and guarding bits and executing an exclusive-or operator on the coded guarding bits and subsets of data bits in the spit byte under the Hamming algorithm to detect whether a bit error occurs in the split byte;

the controller to flip the bit error at the bit error location to self-recover the split byte when a bit error is detected or utilize the delivered data bits in the split byte if no bit error is detected; and the controller to decode a nibble of the data bits from each split byte to provide a byte of data bits from the wireless IO device to the information handling system.

16. The guarding bit data packet self-recovery system executing at a wireless dongle or adapter of claim 15, further comprising:

the controller to transmit a second, updated polling packet with instructions to return a second packet frame with adjustment to the specified data packet length from the wireless IO device to include double the number of data packets to accommodate split bytes with guarding bits included.

17. The guarding bit data packet self-recovery system executing at a wireless dongle or adapter of claim 15, further comprising:

the controller to transmit a second, updated polling packet with instructions to return a second packet frame with adjustment to the specified number of data packets from the wireless IO device to include double the number of data packets to accommodate split bytes with guarding bits included.

18. The guarding bit data packet self-recovery system executing at a wireless dongle or adapter of claim 15, further comprising:

the controller to detect, via executing the Hamming algorithm on a second split byte, a second bit error and to determine a second bit error location in the second split byte.

19. The guarding bit data packet self-recovery system executing at a wireless dongle or adapter of claim 15, further comprising:

the controller to execute machine readable code instructions of the guarding bit data packet self-recovery system to determine that the radiofrequency noise level at the wireless dongle or adapter is above the radiofrequency noise threshold level;

the controller to instruct a radio of the wireless dongle or adapter to conduct a frequency hopping data packet mitigation measure.

20. The guarding bit data packet self-recovery system executing at a wireless dongle or adapter of claim 15, further comprising:

the controller to execute machine readable code instructions of the guarding bit data packet self-recovery system to determine that a data packet error rate level is above a second, higher data packet error threshold level;

the controller to instruct a radio of the wireless dongle or adapter to conduct a data packet retransmission request mitigation measure.

\* \* \* \* \*